(12) United States Patent
Haruyama et al.

(10) Patent No.: US 11,994,774 B2
(45) Date of Patent: May 28, 2024

(54) ELECTRO-OPTICAL DEVICE, ELECTRONIC APPARATUS, AND PROJECTOR

(71) Applicant: SEIKO EPSON CORPORATION, Tokyo (JP)

(72) Inventors: Akihide Haruyama, Suwa (JP); Toru Aoki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/827,826

(22) Filed: May 30, 2022

(65) Prior Publication Data
US 2022/0382109 A1 Dec. 1, 2022

(30) Foreign Application Priority Data

May 31, 2021 (JP) ................................ 2021-091202

(51) Int. Cl.
*G02F 1/1335* (2006.01)
*G02F 1/13363* (2006.01)
*G03B 21/00* (2006.01)
G03B 33/12 (2006.01)

(52) U.S. Cl.
CPC .. *G02F 1/133638* (2021.01); *G02F 1/133526* (2013.01); *G02F 1/133528* (2013.01); *G03B 21/006* (2013.01); *G02F 2201/38* (2013.01); *G02F 2203/01* (2013.01); *G02F 2413/02* (2013.01); *G02F 2413/08* (2013.01); *G03B 33/12* (2013.01)

(58) Field of Classification Search
CPC ......... G02F 1/133638; G02F 1/133526; G02F 1/133528; G02F 2201/38; G02F 2203/01; G02F 2413/02; G02F 2413/08
See application file for complete search history.

(56) References Cited

U.S. PATENT DOCUMENTS

| | | | | |
|---|---|---|---|---|
| 2003/0107693 A1* | 6/2003 | Yamahara | ........... | G02F 1/13306 349/117 |
| 2005/0041185 A1* | 2/2005 | Tanaka | ................ | G02F 1/13363 349/114 |
| 2007/0165165 A1* | 7/2007 | Joten | ................. | G02F 1/133555 349/114 |
| 2008/0198304 A1* | 8/2008 | Oka | .................. | G02F 1/133555 349/96 |

(Continued)

FOREIGN PATENT DOCUMENTS

| | | |
|---|---|---|
| JP | 2014157359 | 8/2014 |
| JP | 2021051132 | 4/2021 |

*Primary Examiner* — James A Dudek
(74) *Attorney, Agent, or Firm* — JCIPRNET

(57) ABSTRACT

In an electro-optical device, a first polarizing element, a first phase difference element, a transmissive liquid crystal panel, a second phase difference element, and a second polarizing element are sequentially arranged. Here, when a phase difference of the first phase difference element and the second phase difference element is λ/4, an influence of orientation disorder of liquid crystal molecules can be alleviated, but a contrast ratio is reduced. Therefore, when a wavelength of incident light is λ, a phase difference R of the first phase difference element and the second phase difference element satisfies the following condition that 0<R<λ/4, preferably λ/12<R<λ/6. For example, it is assumed that the phase difference R is λ/8.

11 Claims, 17 Drawing Sheets

(56) References Cited

U.S. PATENT DOCUMENTS

| | | | |
|---|---|---|---|
| 2009/0128719 A1* | 5/2009 | Tateno | G02F 1/133634 |
| | | | 349/125 |
| 2012/0218527 A1* | 8/2012 | Hatakeyama | G03B 21/54 |
| | | | 353/101 |
| 2019/0250319 A1* | 8/2019 | Kong | G02B 5/3083 |
| 2019/0331987 A1* | 10/2019 | Koyama | G03B 21/145 |
| 2019/0361208 A1* | 11/2019 | Mori | G02B 13/00 |

\* cited by examiner

ELECTRO-OPTICAL DEVICE, ELECTRONIC APPARATUS, AND PROJECTOR

The present application is based on, and claims priority from JP Application Serial Number 2021-091202, filed May 31, 2021, the disclosure of which is hereby incorporated by reference herein in its entirety.

BACKGROUND

1. Technical Field

The present disclosure relates to an electro-optical device, an electronic apparatus, and a projector.

2. Related Art

A transmissive electro-optical device includes a pair of polarizing elements and a transmissive liquid crystal panel arranged between the pair of polarizing elements. Light being linearly polarized light passes through a polarizing element on an incidence side, enters the liquid crystal panel, and is emitted from the liquid crystal panel. Light in the emitted light, which passes through a polarizing element on an emission side, is used for display. It has been proposed that, in the electro-optical device, a λ/4 phase difference element is arranged in each of the spaces between the polarizing element on the incidence side and the liquid crystal panel and between the polarizing element on the emission side and the liquid crystal panel so as to prevent degradation of a modulation property, which is caused when an angle formed between an orientation direction of liquid crystal molecules and a polarizing axis of the polarizing element is deviated from 45 degrees (JP-A-2021-51132).

However, when, as in the technique described in JP-A-2021-51132, the λ/4 phase difference element is arranged in each of the spaces between the polarizing element on the incidence side and the liquid crystal panel and between the polarizing element on the emission side and the liquid crystal panel and light incident on the liquid crystal panel is circularly polarized light, light leakage occurs due to a phase change caused by reflecting the light entering the liquid crystal panel, by a side surface or the like.

With this, a contrast ratio is easily reduced. Thus, the related art has a problem in that reduction of the contrast ratio cannot be suppressed while alleviating an influence due to orientation disorder of the liquid crystal molecules.

SUMMARY

In order to solve the above-mentioned problem, an electro-optical device according to the present disclosure includes a first polarizing element, a second polarizing element, a liquid crystal panel being arranged between the first polarizing element and the second polarizing element, a first phase difference element being arranged between the first polarizing element and the liquid crystal panel, and a second phase difference element being arranged between the liquid crystal panel and the second polarizing element, wherein each of the first phase difference element and the second phase difference element has a phase difference R that satisfies a condition that $0<R<\lambda/4$, where a wavelength of light incident on the liquid crystal panel is λ.

The electro-optical device according to the present disclosure can be used for electronic apparatuses including smartphones, mobile computers, and projection-type display apparatuses, for example.

Further, in order to solve the above-mentioned problem, a projector according to the present disclosure includes a light source, an electro-optical device configured to modulate light from the light source and generate an image, a projection optical system configured to project an image generated by the electro-optical device, and an optical path shifting element configured to shift a projection position of the image, wherein the electro-optical device includes a first polarizing element, a second polarizing element, a liquid crystal panel being arranged between the first polarizing element and the second polarizing element, a first phase difference element being arranged between the first polarizing element and the liquid crystal panel, and a second phase difference element being arranged between the liquid crystal panel and the second polarizing element, and a phase difference R of each of the first phase difference element and the second phase difference element satisfies a condition that $0<R<\lambda/4$, where a wavelength of light incident on the liquid crystal panel is λ.

DESCRIPTION OF EXEMPLARY EMBODIMENTS

Figure 1:
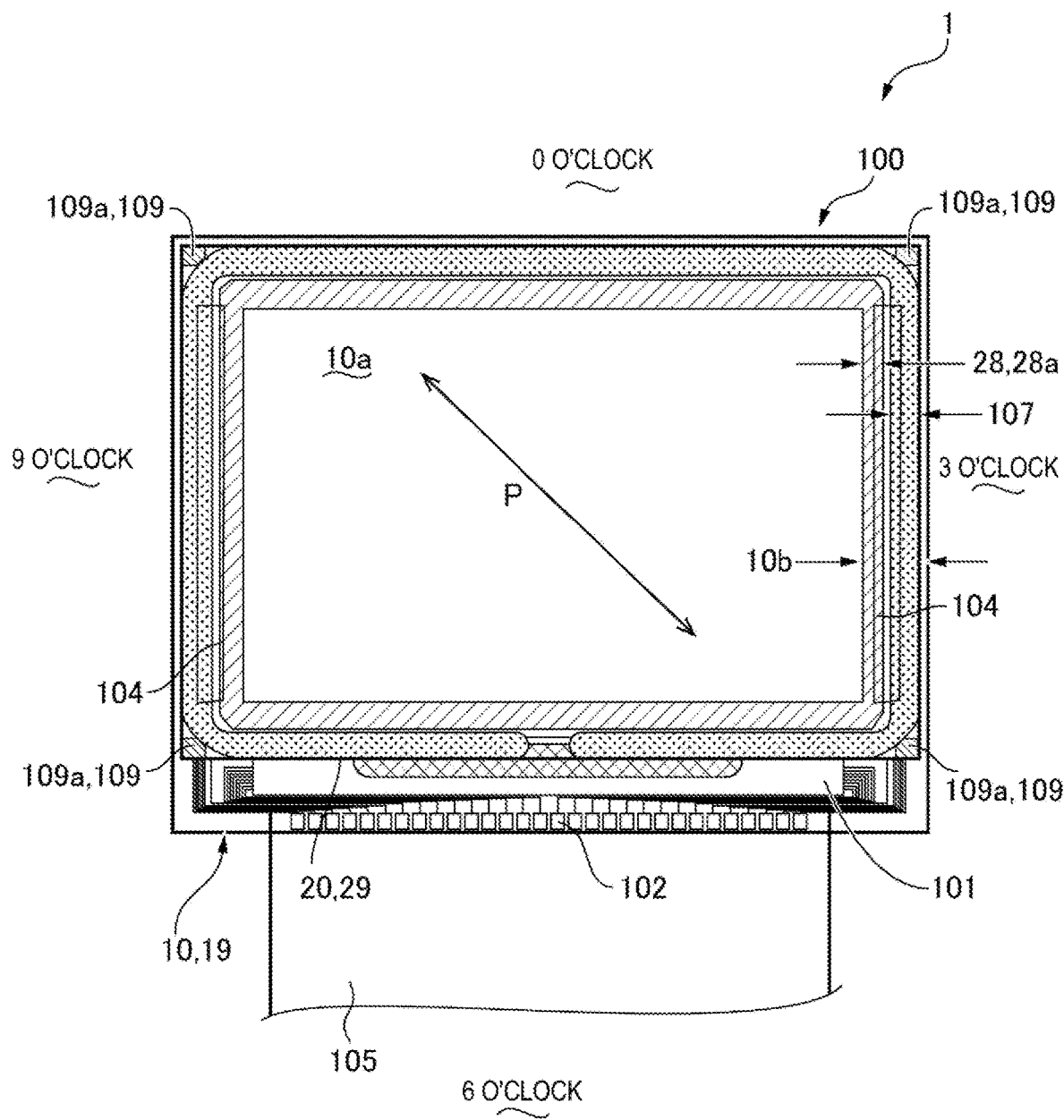
FIG. 1 is a plan view illustrating one aspect of a liquid crystal panel used in an electro-optical device according to a first exemplary embodiment of the present disclosure.

Exemplary embodiments of the present disclosure are described with reference to the drawings. Note that, in each of the figures to be referred to in the following description, to illustrate each layer, each member, and the like in a recognizable size in the drawings, each layer, each member, and the like are illustrated at a different scale. Further, in the following description for grasping a direction and orientation of an optical axis and the like, description is made while viewing a liquid crystal panel 100 from a second substrate 20 side. In this state, a side on which a flexible wiring substrate 105 is connected to the liquid crystal panel 100 is denoted as a direction of 6 o'clock, a side opposite to the side on which the flexible wiring substrate 105 is connected to the liquid crystal panel 100 is denoted as a direction of 0 o'clock, a right direction is denoted as a direction of 3 o'clock, and left direction is denoted as a direction of 9 o'clock.

1. First Exemplary Embodiment

1-1. Configuration of Electro-Optical Device

Figure 2:
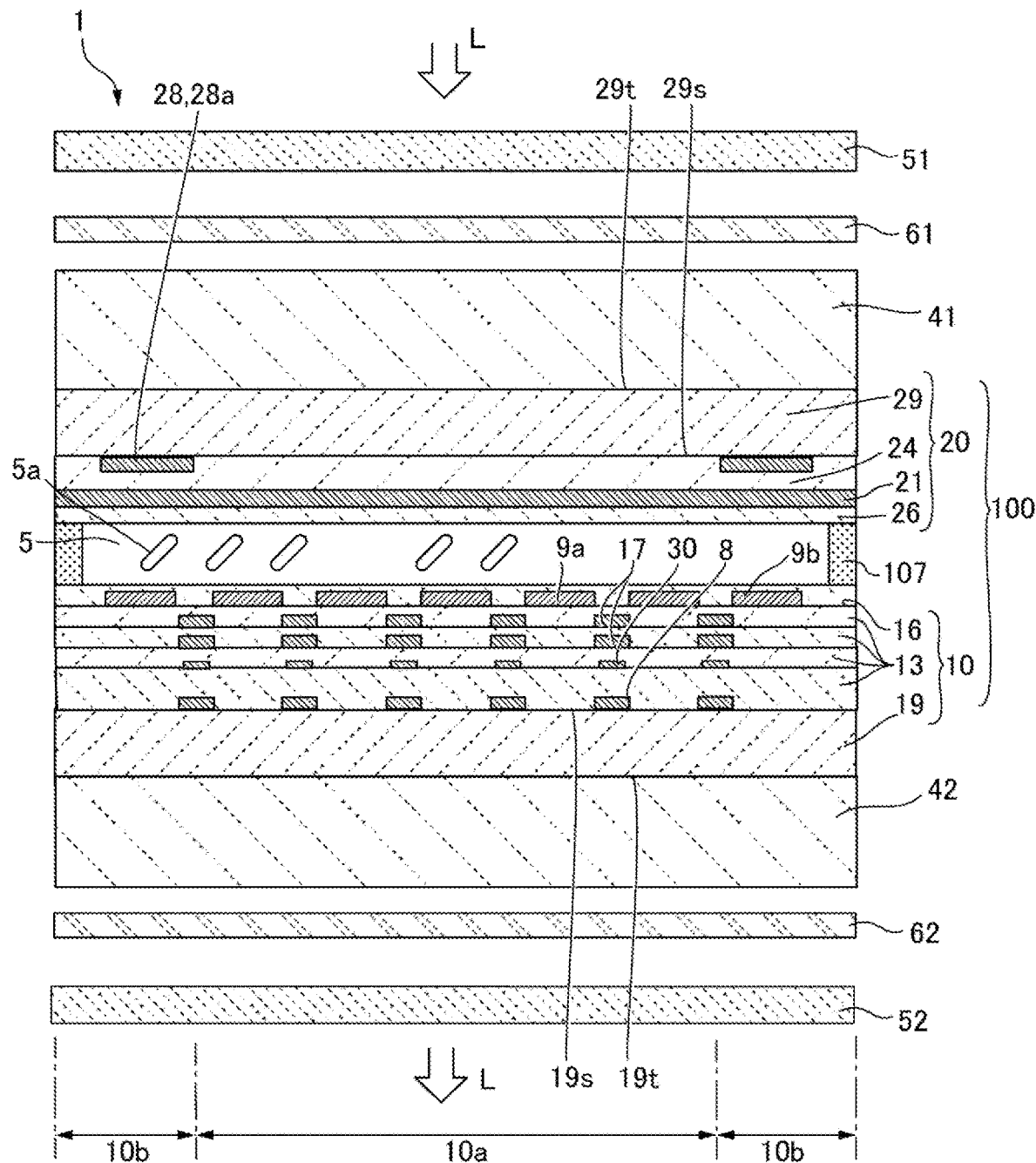
FIG. 2 is an explanatory diagram schematically illustrating a cross-section of the electro-optical device according to the first exemplary embodiment of the present disclosure.

FIG. 1 is a plan view illustrating one aspect of the liquid crystal panel 100 used in an electro-optical device 1 according to a first exemplary embodiment of the present disclosure and illustrating a state in which electro-optical device 1 is viewed from the second substrate 20 side. FIG. 2 is an explanatory diagram schematically illustrating a cross-section of the electro-optical device according to the first exemplary embodiment of the present disclosure.

As illustrated in FIG. 1 and FIG. 2, the electro-optical device 1 according to the present exemplary embodiment includes a first polarizing element 51, a second polarizing element 52, and the liquid crystal panel 100 that is arranged between the first polarizing element 51 and the second polarizing element 52. First, the electro-optical device 1 includes a first phase difference element 61 that is arranged between the first polarizing element 51 and the liquid crystal panel 100 and a second phase difference element 62 that is arranged between the liquid crystal panel 100 and the second polarizing element 52.

In the liquid crystal panel 100, a first substrate 10 being an element substrate and a second substrate 20 being a counter substrate are bonded to each other via a sealing material 107 with a predetermined gap therebetween, and the first substrate 10 and the second substrate 20 face each other. The sealing material 107 is provided along an outer edge of the second substrate 20 to have a frame shape, and a liquid crystal layer 5 is arranged in a region surrounded by the sealing material 107 between the first substrate 10 and the second substrate 20.

The first polarizing element 51 and the second polarizing element 52 are arranged in a crossed-Nicols state in which the polarizing axes thereof form an angle of 90 degrees. The liquid crystal panel 100 is configured so that an orientation direction P of liquid crystal molecules 5a described later forms and angle of 45 degrees with respect to the polarizing axes of the first polarizing element 51 and the second polarizing element 52. The angle formed between the polarizing axis of the first polarizing element 51 and the polarizing axis of the second polarizing element 52 is not limited to 90 degrees. In consideration of a tolerance generated during manufacturing and the like, the angle may fall within a range of ±5 degrees from 90 degrees. Further, the angle formed between the polarizing axes of the first polarizing element 51 and the second polarizing element 52 and the orientation direction P is not limited to 45 degrees. In consideration of a tolerance generated during manufacturing and the like, the angle may fall within a range of ±5 degrees from 45 degrees.

The first phase difference element 61 is arranged to have a slow axis forming an angle of 45 degrees with respect to the polarizing axis of the first polarizing element 51, and the second phase difference element 62 is arranged to have a slow axis forming an angle of 45 degrees with respect to the polarizing axis of the second polarizing element 52. Therefore, the first phase difference element 61 and the second phase difference element 62 are arranged so that the slow axes are parallel, substantially parallel, orthogonal, or substantially orthogonal to each other. In the present exemplary embodiment, the first phase difference element 61 and the second phase difference element 62 are arranged so that the slow axes are orthogonal or substantially orthogonal to each other.

1-2. Details of Configuration of Liquid Crystal Panel 100

In the liquid crystal panel 100, the first substrate 10 and the second substrate 20 each have a quadrangular shape. In a substantially central portion of the liquid crystal panel 100, a display region 10a is provided as a region having a longer dimension in the direction from 3 o'clock toward 9 o'clock and a shorter dimension in the direction from 0 o'clock toward 6 o'clock. The display region 10a is surrounded by a peripheral region 10b.

The substrate main body 19 of the first substrate 10 is formed of a transmissive substrate without refractive index anisotropy, such as quartz and glass, and a part from the substrate main body 19 to the first orientation film 16 corresponds to the first substrate 10. On one surface 19s side of the substrate main body 19 on the second substrate 20 side, on an outer side of the display region 10a, a data line driving circuit 101 and a plurality of terminals 102 are formed along one side of the first substrate 10. A scan line driving circuit 104 is formed along other sides adjacent to the one side. The flexible wiring substrate 105 is connected to the terminal 102, and various potentials and various signals are input to the first substrate 10 via the flexible wiring substrate 105.

In the display region 10a on the one surface 19s side of the substrate main body 19, a plurality of pixel electrodes 9a, each of which is formed of an Indium Tin Oxide (ITO) film or the like and has translucency, and pixel switching elements 30, each of which electrically being connected to each of the plurality of pixel electrodes 9a, are formed in a matrix pattern. Further, wiring lines 17 are provided between layers of a plurality of insulating films 13 that are layered between the substrate main body 19 and the pixel electrodes 9a. The first orientation film 16 is formed on the second substrate 20 side with respect to the pixel electrodes 9a, and the pixel electrodes 9a are covered with the first orientation film 16.

A substrate main body 29 of the second substrate 20 is formed of a transmissive substrate without refractive index anisotropy, such as quartz and glass, and a part from the substrate main body 29 to a second orientation film 26 corresponds to the second substrate 20. On one surface 29s side of the substrate main body 29, which is a surface on the first substrate 10 side, a common electrode 21 that is formed of an ITO film or the like and has translucency is formed, and the second orientation film 26 is formed on the first substrate 10 side with respect to the common electrode 21. The common electrode 21 is formed substantially entirely at the second substrate 20. On a side opposite to the first substrate 10 with respect to the common electrode 21, a light-shielding layer 28 that is formed of metal or a metal compound and has a light-shielding property and a flattened layer 24 having translucency are formed. The light-shielding layer 28 is formed, for example, as a partition 28a in a frame-like shape extending along the outer peripheral edge of the display region 10a. The light-shielding layer 28 may be formed as a black matrix in a region overlapping in plan view with a region located between the pixel electrodes 9a adjacent to each other.

In the present exemplary embodiment, regions overlapping, when viewed in plan view, with the partition 28a in the peripheral region 10b of the first substrate 10 are formed with dummy pixel electrodes 9b formed simultaneously with the pixel electrodes 9a.

The first substrate 10 includes an inter-substrate conduction electrode 109 being formed in a region positioning outside the sealing material 107 and overlapping with a corner portion of the second substrate 20 such that electrical conduction is established between the first substrate 10 and the second substrate 20. An inter-substrate conduction material 109a including conductive particles is arranged in the inter-substrate conduction electrode 109. The common electrode 21 of the second substrate 20 is electrically connected to the first substrate 10 side via the inter-substrate conduction material 109a and the inter-substrate conduction electrode 109. Therefore, a common potential is applied to the common electrode 21 from the first substrate 10 side.

The pixel electrodes 9a and the common electrode 21 are formed of a translucent conductive layer such as an ITO film, and the electro-optical device 1 is configured as a transmissive electro-optical device. In the electro-optical device 1, light entering one of the first substrate 10 and the second substrate 20, passes through the other one, and is emitted. During this course, the light is modulated, and an image is thus displayed. In the present exemplary embodiment, the light entering the second substrate 20, as indicated by the arrow L, is modulated by the liquid crystal layer 5 at each pixel while passing through the first substrate 10 and being emitted, thereby displaying an image.

1-3. Configuration of Transmissive Substrate for Dust Prevention

When the electro-optical device 1 is used as a light valve or the like of a projection-type display apparatus described later as illustrated in FIG. 2, a first transmissive plate 41 for dust prevention is bonded with an adhesive or the like to another surface 29t on a side opposite to the first substrate 10 side with respect to the substrate main body 29 of the second substrate 20. A second transmissive plate 42 for dust prevention is bonded with an adhesive or the like to another surface 19t of the first substrate 10 on a side opposite to the second substrate 20 of the substrate main body 29. Therefore, a foreign matter such as dust does not adhere directly to the liquid crystal panel 100, and hence reflection of a foreign matter in an image can be suppressed. Each of the first transmissive plate 41 and the second transmissive plate 42 is formed of a substrate without refractive index anisotropy, such as quartz and glass.

1-4. Configuration of Liquid Crystal Layer 5 and the Like

Figure 3:
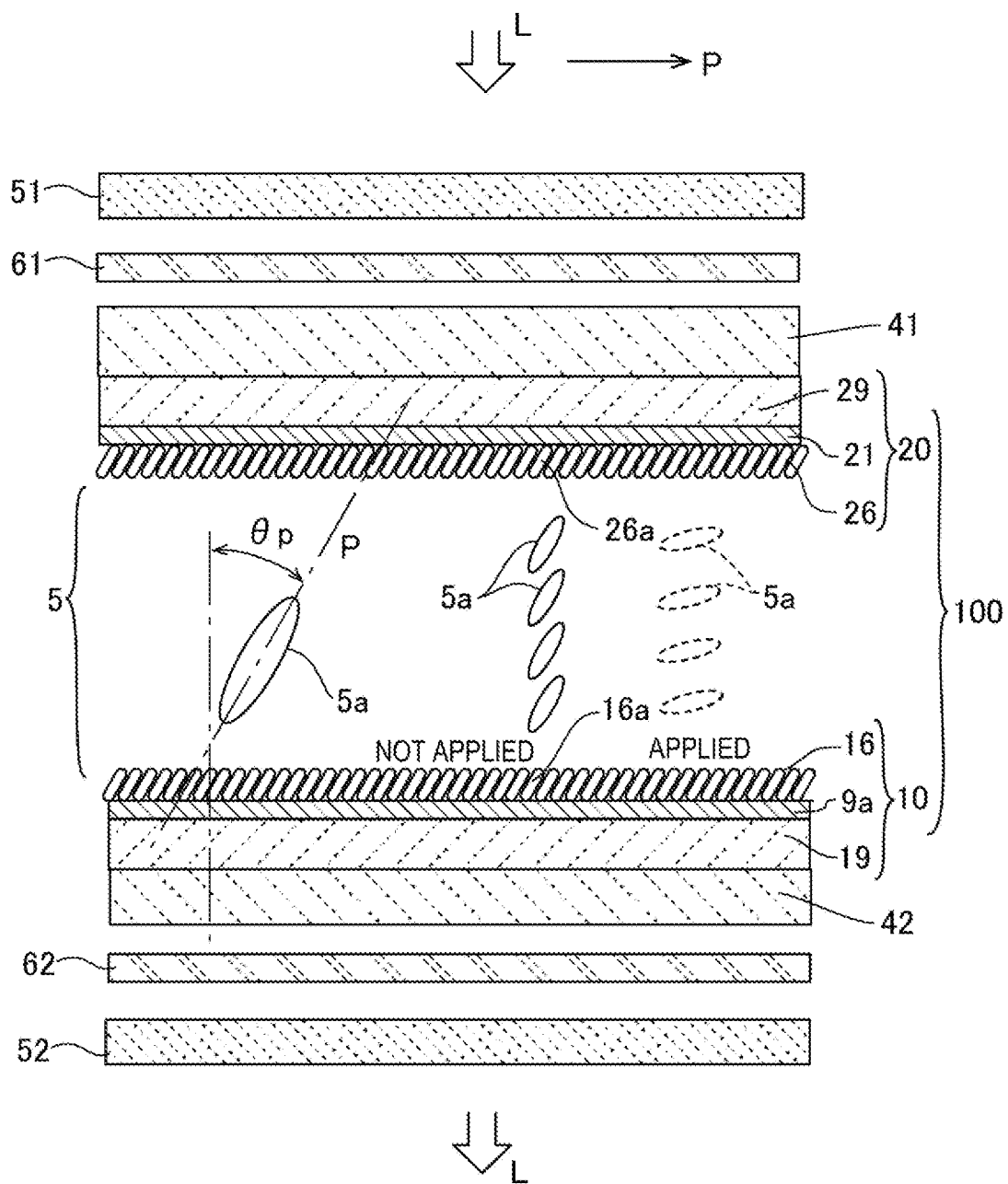
FIG. 3 is an explanatory diagram schematically illustrating liquid crystal molecules and the like of the electro-optical device illustrated in FIG. 2.

FIG. 3 is an explanatory diagram schematically illustrating the liquid crystal molecules 5a and the like of the electro-optical device 1 illustrated in FIG. 2. As illustrated in FIG. 3, the first orientation film 16 and the second orientation film 26 are each an inorganic orientation film formed of an obliquely deposited film of, for example, $SiO_x$ ($x \leq 2$), $TiO_2$, MgO, or $Al_2O_3$. Accordingly, the first orientation film 16 and the second orientation film 26 each include a columnar structure layer in which respective columnar bodies 16a or 26a each named a column are obliquely formed with respect to both the first substrate 10 and the second substrate 20. Thus, in the first orientation film 16 and the second orientation film 26, the liquid crystal molecules 5a that have negative dielectric anisotropy and are used in the liquid crystal layer 5 are oriented diagonally with respect to the first substrate 10 and the second substrate 20. With this, the liquid crystal molecules 5a are pre-tilted.

Herein, a pretilt angle θp refers to an angle defined between a direction orthogonal to the first substrate 10 and the second substrate 20 and the major axis (orientation direction) of the liquid crystal molecules 5a in a state where no voltage is being applied between the pixel electrodes 9a and the common electrode 21. In the present exemplary embodiment, the pre-tilt angle θp is 5 degrees, for example.

In this way, the electro-optical device 1 is configured as an electro-optical device employing a vertical alignment (VA) mode. In the electro-optical device 1 thus configured, upon a voltage applied between the pixel electrode 9a and the common electrode 21, the liquid crystal molecules 5a are displaced to minimize the tilt angle with respect to the first substrate 10 and the second substrate 20 as indicated with the dotted line. The direction of such a displacement corresponds to so-called a clear vision direction. In the present exemplary embodiment, as illustrated in FIG. 1, the orientation direction P (clear view direction) of the liquid crystal molecules 5a is a direction in plan view from 04:30 toward 10:30 on a clock.

Figure 4:
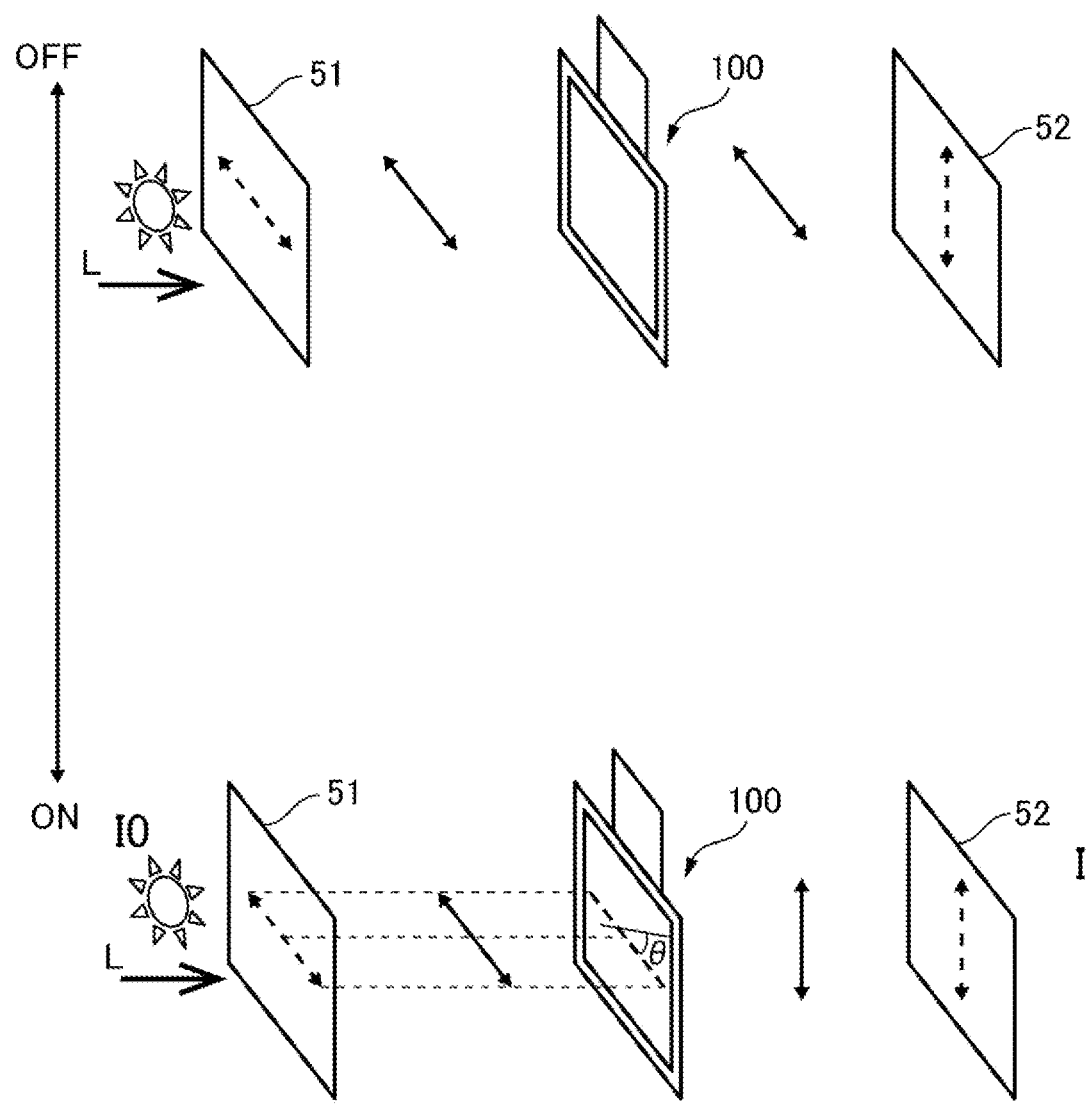
FIG. 4 is an explanatory diagram of an electro-optical device in a first reference example of the present disclosure.
Figure 5:
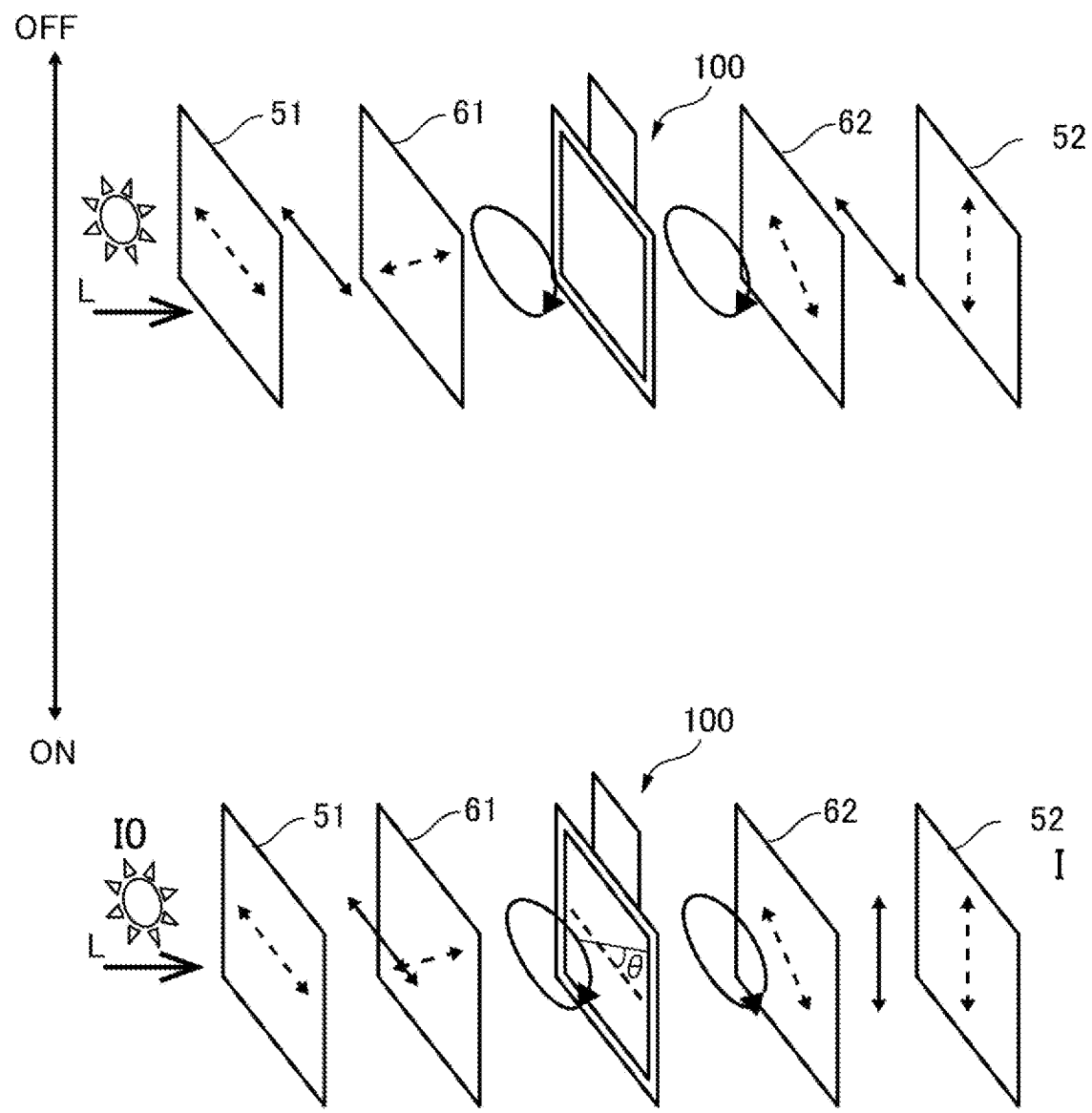
FIG. 5 is an explanatory diagram of an electro-optical device in a second reference example of the present disclosure.
Figure 6:
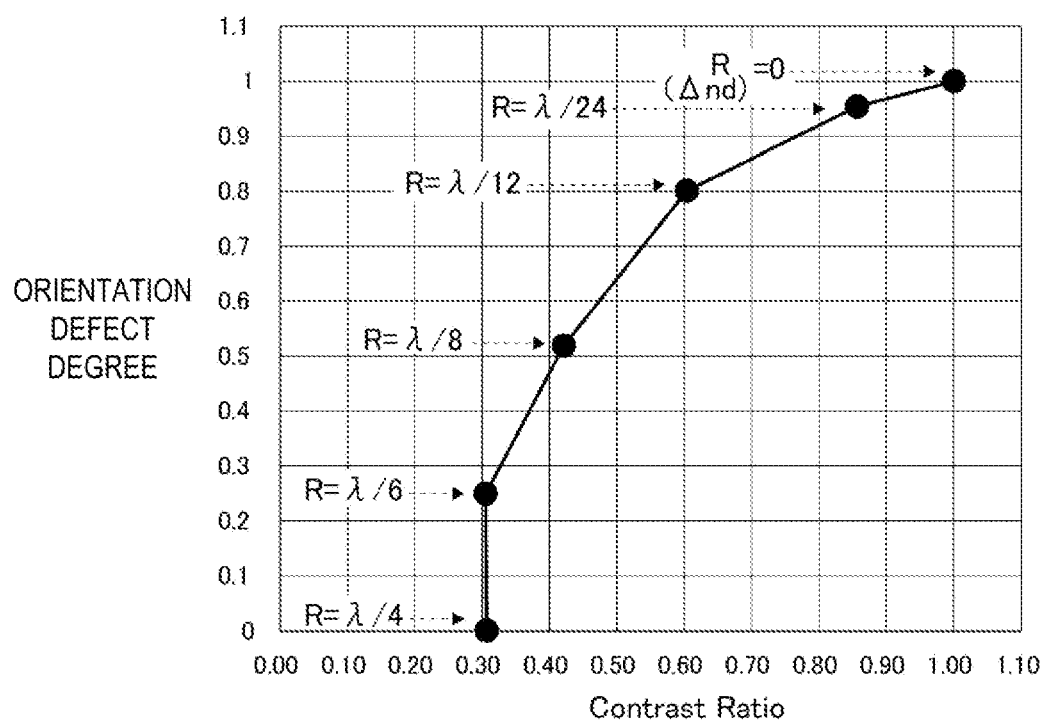
FIG. 6 is a graph showing a relationship between quality of an image of the electro-optical device illustrated in FIG. 2 and a phase difference of a phase difference element.

1-5. Configurations of First Phase Difference Element 61 and Second Phase Difference Element 62 and the Like FIG. 4 is an explanatory diagram of an electro-optical device in a first reference example of the present disclosure. FIG. 5 is an explanatory diagram of an electro-optical device in a second reference example of the present disclosure. FIG. 6 is a graph showing a relationship between quality of an image of the electro-optical device 1 illustrated in FIG. 2 and a phase difference R of the phase difference element. In FIG. 4 and FIG. 5, the polarizing axis of the first polarizing element 51, the slow axis of the first phase difference element 61, the orientation direction of the liquid crystal molecules in the liquid crystal panel 100, the slow axis of the second phase difference element 62, and the polarizing axis of the second polarizing element 52 are indicated with the respective dotted lines, and a polarizing state of the light or the like is indicated with the arrow of the solid line.

In the present exemplary embodiment, for example, the first phase difference element 61 and the second phase difference element 62 are formed of an inorganic material, for example. Examples of the first phase difference element 61 and the second phase difference element 62 may include a birefringent crystal such as a rock crystal and sapphire. Further, each of the first phase difference element 61 and the second phase difference element 62 may be formed of a diagonally vapor-deposited film formed at the transmissive substrate.

The first phase difference element 61 and the second phase difference element 62 are formed of an organic material in some cases. More specifically, in some cases, the first phase difference element 61 and the second phase difference element 62 are formed of a sheet member provided with anisotropy due to extension or light orientation of an organic polymer such as polycarbonate, polyvinyl alcohol, polysulfone, and polycyclo-olefin. In this case, each of the first phase difference element 61 and the second phase difference element 62 is used in a state of being bonded to the transmissive substrate.

In the present exemplary embodiment, each of the first phase difference element 61 and the second phase difference element 62 has the phase difference R that satisfies the following condition that $0<R<\lambda/4$, preferably, $\lambda/12<R<\lambda/6$, where a wavelength of the incident light to the liquid crystal panel 100 is $\lambda$. For example, each of the first phase difference element 61 and the second phase difference element 62 has the phase difference R of $\lambda/8$.

With reference to FIG. 4, FIG. 5, and FIG. 6, the phase difference R is described below. When the first phase difference element 61 and the second phase difference element 62 are not present, first linearly polarized light that is emitted from the first polarizing element 51 enters the liquid crystal panel 100, as illustrated in FIG. 4. Here, when a pixel is in an off state corresponding to black display, light being the first linearly polarized light is emitted from the liquid crystal panel 100. Thus, emission is not performed from the second polarizing element 52.

In contrast, when a pixel is in an on state corresponding to white display, light being second linearly polarized light is emitted from the liquid crystal panel 100. Such light being the second linearly polarized light is emitted from the second polarizing element 52.

An emitted light amount I in this case is expressed in Equation given below.

$$I=I0\cdot\sin^2(2\theta)\cdot\sin^2(n\cdot\Delta nd/\lambda) \quad \text{Equation (1)}$$

I0=Amount of incident light
θ=Angle formed between orientation direction of liquid crystal layer and polarizing axis of polarizing element
n=Refractive index of liquid crystal layer
Δnd=Retardation of liquid crystal layer
λ=Wavelength of incident light Therefore, the emitted light amount I in influenced by the angle θ formed between the orientation direction of the liquid crystal layer and the polarizing axis of the polarizing element. Here, the polarizing axis of the polarizing element corresponds to an optical axis direction of the light being the first linearly polarized light entering the liquid crystal panel 100. Therefore, a horizontal electric field causes disorder in the orientation of the liquid crystal molecules, which influences the emitted light amount I. As a result, a black part is generated on a white image screen.

Meanwhile, in a case of a 1/4λ phase difference element having a phase difference of λ/4, when incident light that is linearly polarized has a vibration direction incident at an angle of θ=+45 degrees with respect to the slow axis of the 1/4λ phase difference element, emitted light from the 1/4λ phase difference element is clockwise circularly polarized light. In contrast, when the angle formed between the vibration direction of the incident light and the slow axis of the 1/4λ phase difference element is an angle of θ=−45 degrees, the light is counterclockwise circularly polarized light. Therefore, as illustrated in FIG. 5, it is assumed that, in the liquid crystal panel 100, the first linearly polarized light emitted from the first polarizing element 51 enters the first phase difference element 61 and the clockwise circularly polarized light enters the liquid crystal panel 100. Here, when the pixel is in an off state corresponding to black display, the clockwise circularly polarized light is emitted from the liquid crystal panel 100. As a result, the clockwise circularly polarized light enters the second phase difference element 62. Therefore, light being the first linearly polarized light is emitted from the second phase difference element 62. Thus, emission is not performed from the second polarizing element 52.

In contrast, when a pixel is an on sate corresponding to white display, the counterclockwise circularly polarized light is emitted from the liquid crystal panel 100. As a result, the counterclockwise circularly polarized light enters the second phase difference element 62. Therefore, light being the second linearly polarized light is emitted from the second phase difference element 62. Such light being the second linearly polarized light is emitted from the second polarizing element 52.

Here, when the light entering the liquid crystal panel 100 is circularly polarized light, the member $\sin^2(2\theta)$ in Equation (1) is not present. Thus, the emitted light amount I is expressed in the following equation. Therefore, even when a horizontal electric field causes disorder in the orientation of the liquid crystal molecules, the emitted light amount I is not influenced by this. Thus, a black part can be prevented from being generated on a white image screen. Thus, when the phase difference of the first phase difference element 61 and the second phase difference element 62 is set to λ/4, an influence due to an orientation defect can be suppressed as much as possible.

$$I=I0\cdot\sin^2(n\cdot\Delta nd/\lambda) \quad \text{Equation (2)}$$

However, in a case of circularly polarized light, light leakage easily occurs due to a phase change when the light entering the liquid crystal panel 100 is reflected by the side surface of wiring line or the like, and a contrast ratio is easily reduced as described in below with reference to FIG. 6.

FIG. 6 illustrates an influence of an orientation defect of the electro-optical device 1 and a change of a contrast ratio when the phase difference R of the first phase difference element 61 and the second phase difference element 62 is changed from 0 to λ/4. The horizontal axis indicates a contrast ratio, and the contrast ratio is higher as approaching the right side. The vertical axis indicates an orientation defect degree, and the influence of the orientation defect is greater as approaching the upper side. As shown in FIG. 6, when the phase difference R of the first phase difference element 61 and the second phase difference element 62 is 0, the contrast ratio is high, but the influence of the orientation defect is great. Further, when the phase difference R of the first phase difference element 61 and the second phase difference element 62 approaches λ/4, the contrast ratio is reduced while suppressing the influence of the orientation defect. Based on those results, in the present exemplary embodiment, the phase difference R of the first phase difference element 61 and the second phase difference element 62 is set to satisfy the following condition.

$$0<R<\lambda/4$$

Therefore, reduction of the contrast ratio can be suppressed while suppressing the influence of the orientation defect. Here, the phase difference R of the first phase difference element 61 and the second phase difference element 62 is preferably set to satisfy the following condition.

$$\lambda/12<R<\lambda/6$$

For example, the phase difference R of the first phase difference element 61 and the second phase difference element 62 is preferably set to λ/8. With this configuration, in the electro-optical device 1, reduction of the contrast ratio can further be suppressed while suppressing the influence of the orientation defect more appropriately.

2. Second Exemplary Embodiment

Figure 7:
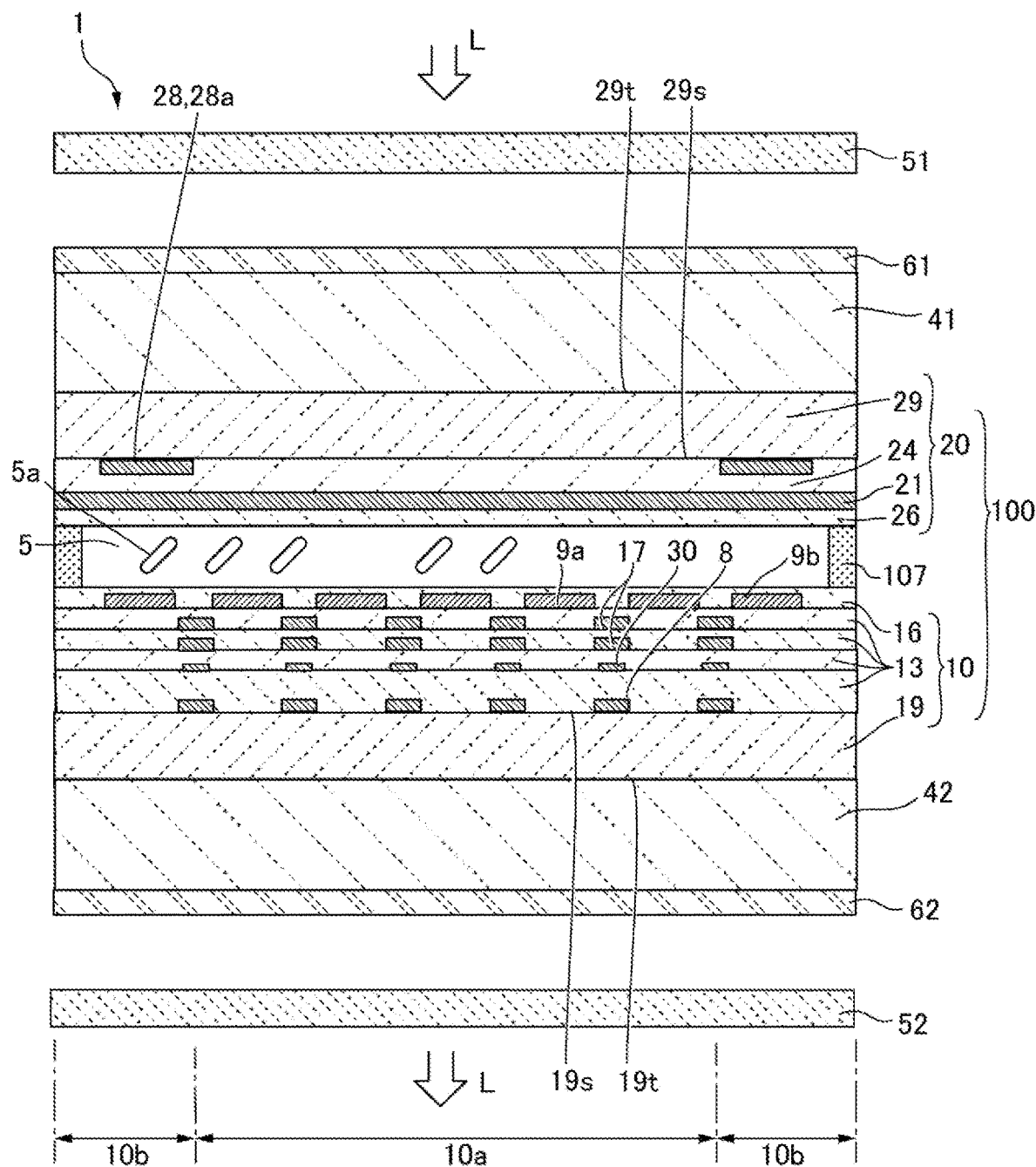
FIG. 7 is an explanatory diagram illustrating an electro-optical device according to a second exemplary embodiment of the present disclosure.

FIG. 7 is an explanatory diagram illustrating the electro-optical device 1 according to a second exemplary embodiment of the present disclosure. The present exemplary embodiment and exemplary embodiments described later have basic configurations similar to that in the first exemplary embodiment. Accordingly, common components are denoted with the identical reference symbols, and description therefor is omitted.

As illustrated in FIG. 7, in the electro-optical device 1 according to the present exemplary embodiment, each of the first phase difference element 61 and the second phase difference element 62 is fixed to the liquid crystal panel 100. In the present exemplary embodiment, the first transmissive plate 41 and the second transmissive plate 42 for dust prevention are fixed to the liquid crystal panel 100 with an adhesive or the like. Thus, the first phase difference element 61 and the second phase difference element 62 are fixed to the liquid crystal panel 100 via the first transmissive plate 41 and the second transmissive plate 42, respectively.

More specifically, the first phase difference element 61 is fixed to a surface of the first transmissive plate 41 on a side opposite to the liquid crystal panel 100, and the second phase difference element 62 is fixed to a surface of the second transmissive plate 42 on a side opposite to the liquid crystal panel 100. Here, for example, the first phase difference element 61 and the second phase difference element 62 are fixed directly to the first transmissive plate 41 and the second transmissive plate 42. Further, each of the first phase difference element 61 and the second phase difference element 62 may be bonded to a transmissive support plate, and the support plate may be fixed to corresponding one of the first transmissive plate 41 and the second transmissive plate 42.

Alternatively, the first phase difference element 61 may be fixed between the first transmissive plate 41 and the liquid crystal panel 100, and the second phase difference element 62 may be fixed between the second transmissive plate 42 and the liquid crystal panel 100. In this case, the first phase difference element 61 is fixed to both the first transmissive plate 41 and the second substrate 20 of the liquid crystal panel 100 with an adhesive or the like, and the second phase difference element 62 is fixed to both the second transmissive plate 42 and the first substrate 10 of the liquid crystal panel 100 with an adhesive or the like.

2-1. Modification Example of Second Exemplary Embodiment

Figure 8:
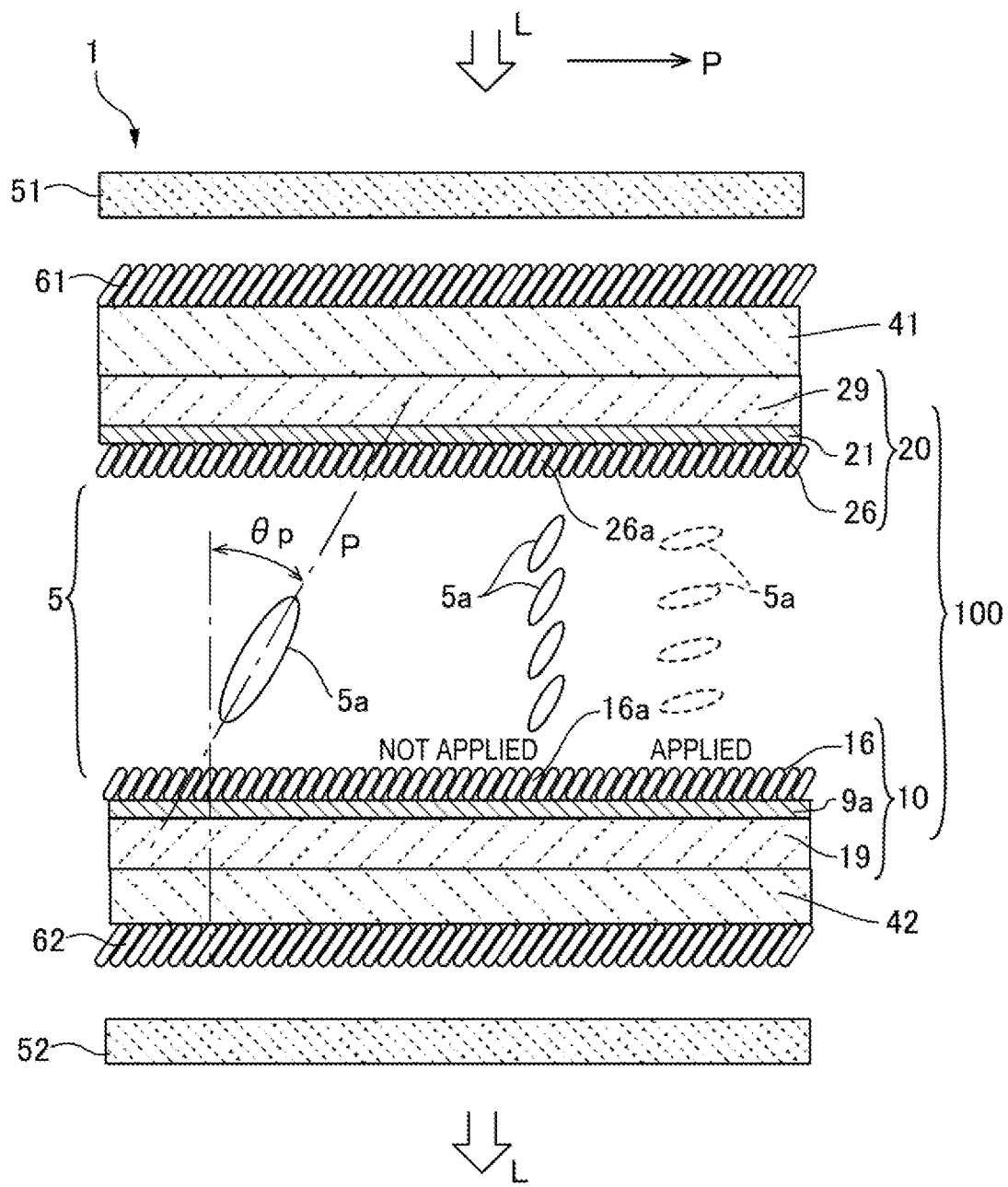
FIG. 8 is an explanatory diagram illustrating an electro-optical device in a modification example according to the second exemplary embodiment of the present disclosure.

FIG. 8 is an explanatory diagram illustrating the electro-optical device 1 in a modification example according to the second exemplary embodiment of the present disclosure. As illustrated in FIG. 8, when the first phase difference element 61 and the second phase difference element 62 are fixed to the liquid crystal panel 100, the first phase difference element 61 and the second phase difference element 62 may be formed of inorganic films that are diagonally vapor-deposited on the surface of the first transmissive plate 41 on the side opposite to the liquid crystal panel 100 and the surface of the second transmissive plate 42 on the side opposite to the liquid crystal panel 100.

Alternatively, the first phase difference element 61 may be fixed between the first transmissive plate 41 and the liquid crystal panel 100, and the second phase difference element 62 may be fixed between the second transmissive plate 42 and the liquid crystal panel 100. In this case, the inorganic film forming the first phase difference element 61 is formed at the first transmissive plate 41 or the second substrate 20 of the liquid crystal panel 100, and the inorganic film forming the second phase difference element 62 is formed at the second transmissive plate 42 or the first substrate 10 of the liquid crystal panel 100.

3. Third Exemplary Embodiment

Figure 9:
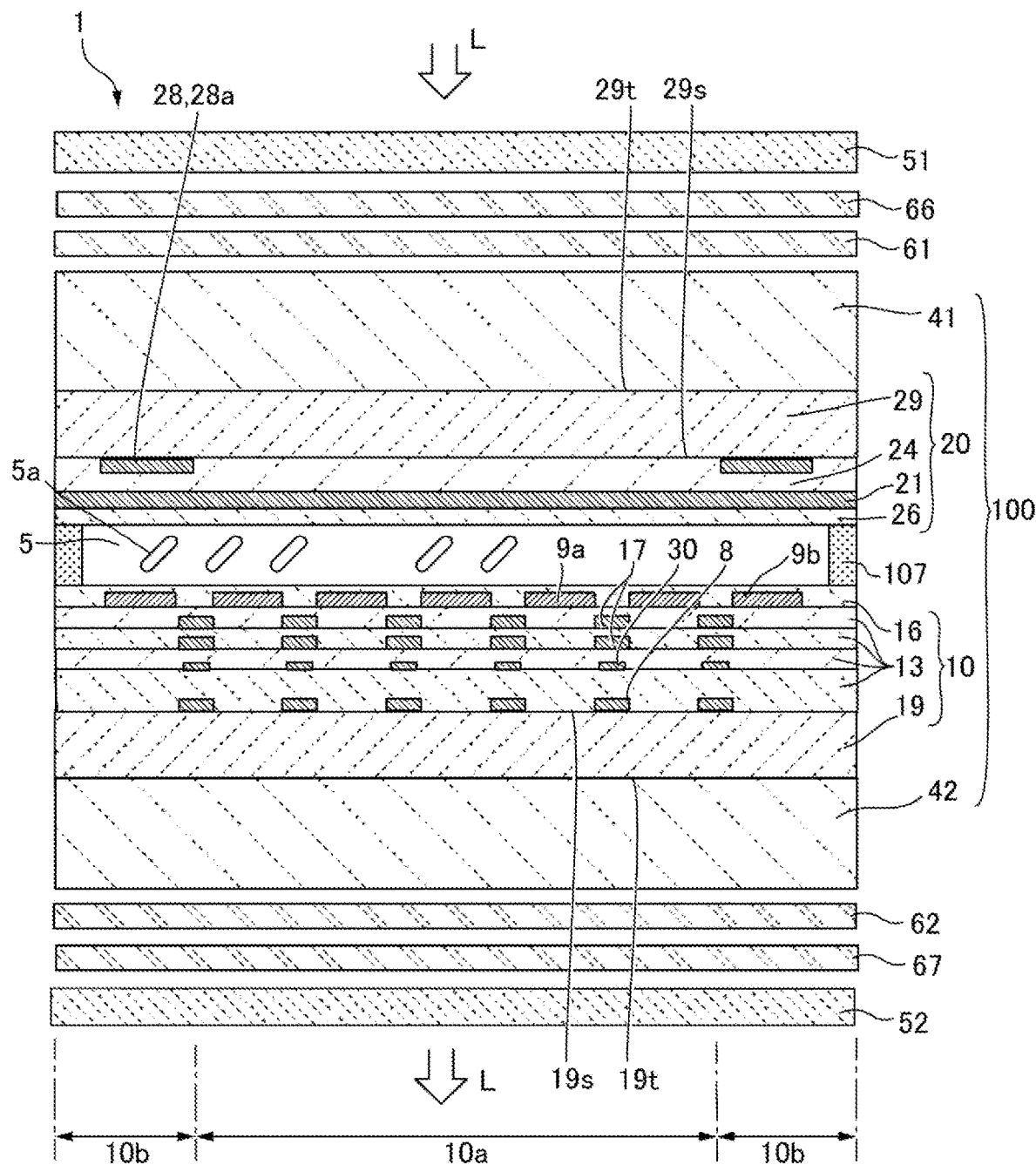
FIG. 9 is an explanatory diagram illustrating an electro-optical device according to a third exemplary embodiment of the present disclosure.

FIG. 9 is an explanatory diagram illustrating the electro-optical device 1 according to a third exemplary embodiment of the present disclosure. As illustrated in FIG. 9, in the electro-optical device 1 according to the present exemplary embodiment, the first phase difference element 61 and a first $\lambda/2$ phase difference element 66 are arranged between the first polarizing element 51 and the liquid crystal panel 100, and the second phase difference element 62 and a second $\lambda/2$ phase difference element 67 are arranged between the second polarizing element 52 and the liquid crystal panel 100. For example, the first $\lambda/2$ phase difference element 66 is arranged between the first polarizing element 51 and the first phase difference element 61, and the second $\lambda/2$ phase difference element 67 is arranged between the second polarizing element 52 and the second phase difference element 62. Therefore, the first phase difference element 61 and the first $\lambda/2$ phase difference element 66 can form a broadband phase difference element capable of dealing with a broader band, and the second phase difference element 62 and the second $\lambda/2$ phase difference element 67 can form a broadband phase difference element capable of dealing with a broader band.

Here, each of the first phase difference element 61 and the first $\lambda/2$ phase difference element 66 is formed of an inorganic material or an organic material, and each of the second phase difference element 62 and the second $\lambda/2$ phase difference element 67 is formed of an inorganic material or an organic material.

3-1. First Modification Example of Third Exemplary Embodiment

Figure 10:
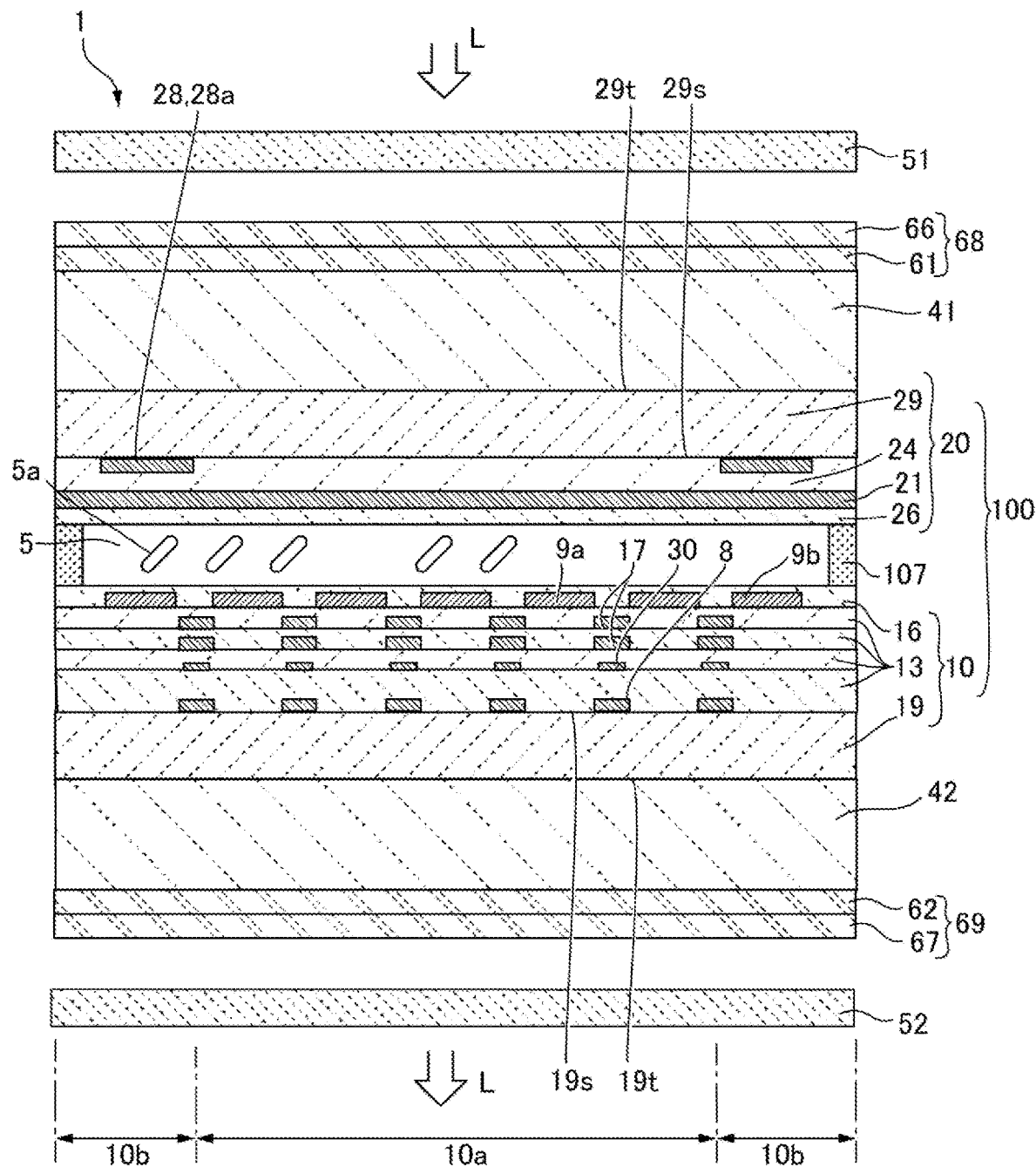
FIG. 10 is an explanatory diagram illustrating an electro-optical device in a first modification example according to the third exemplary embodiment of the present disclosure.

FIG. 10 is an explanatory diagram illustrating the electro-optical device 1 in a first modification example according to the third exemplary embodiment of the present disclosure. As illustrated in FIG. 10, similarly to the third exemplary embodiment, in the electro-optical device 1 according to the present exemplary embodiment, the first phase difference element 61 and the first $\lambda/2$ phase difference element 66 are arranged between the first polarizing element 51 and the liquid crystal panel 100, and the second phase difference element 62 and the second $\lambda/2$ phase difference element 67 are arranged between the second polarizing element 52 and the liquid crystal panel 100. Here, the first phase difference element 61 and the first $\lambda/2$ phase difference element 66 function as an integrated optical element 68 that is fixed to the liquid crystal panel 100, and the second phase difference element 62 and the second $\lambda/2$ phase difference element 67 function as an integrated optical element 69 that is fixed to the liquid crystal panel 100. More specifically, the first phase difference element 61 and the first $\lambda/2$ phase difference element 66 as the integrated optical element 68 are fixed to the liquid crystal panel 100 via the first transmissive plate 41, and the second phase difference element 62 and the second $\lambda/2$ phase difference element 67 as the integrated optical element 69 are fixed to the liquid crystal panel 100 via the second transmissive plate 42.

In the present exemplary embodiment, in the optical element 68, the first phase difference element 61 and the first λ/2 phase difference element 66 are fixed to each other directly or via a transmissive support plate. In the optical element 69, the second phase difference element 62 and the second λ/2 phase difference element 67 are fixed to each other directly or via a transmissive support plate.

Note that the optical element 68 including the first phase difference element 61 and the first λ/2 phase difference element 66 maybe arranged between the first transmissive plate 41 and the liquid crystal panel 100, and the optical element 69 including the second phase difference element 62 and the second λ/2 phase difference element 67 may be arranged between the second transmissive plate 42 and the liquid crystal panel 100. In this case, the optical element 68 including the first phase difference element 61 and the first λ/2 phase difference element 66 may be fixed to both the first transmissive plate 41 and the second substrate 20 of the liquid crystal panel 100 with an adhesive or the like, and the optical element 69 including the second phase difference element 62 and the second λ/2 phase difference element 67 may be fixed to both the second transmissive plate 42 and the first substrate 10 of the liquid crystal panel 100 with an adhesive or the like.

3-2. Second Modification Example of Third Exemplary Embodiment

Figure 11:
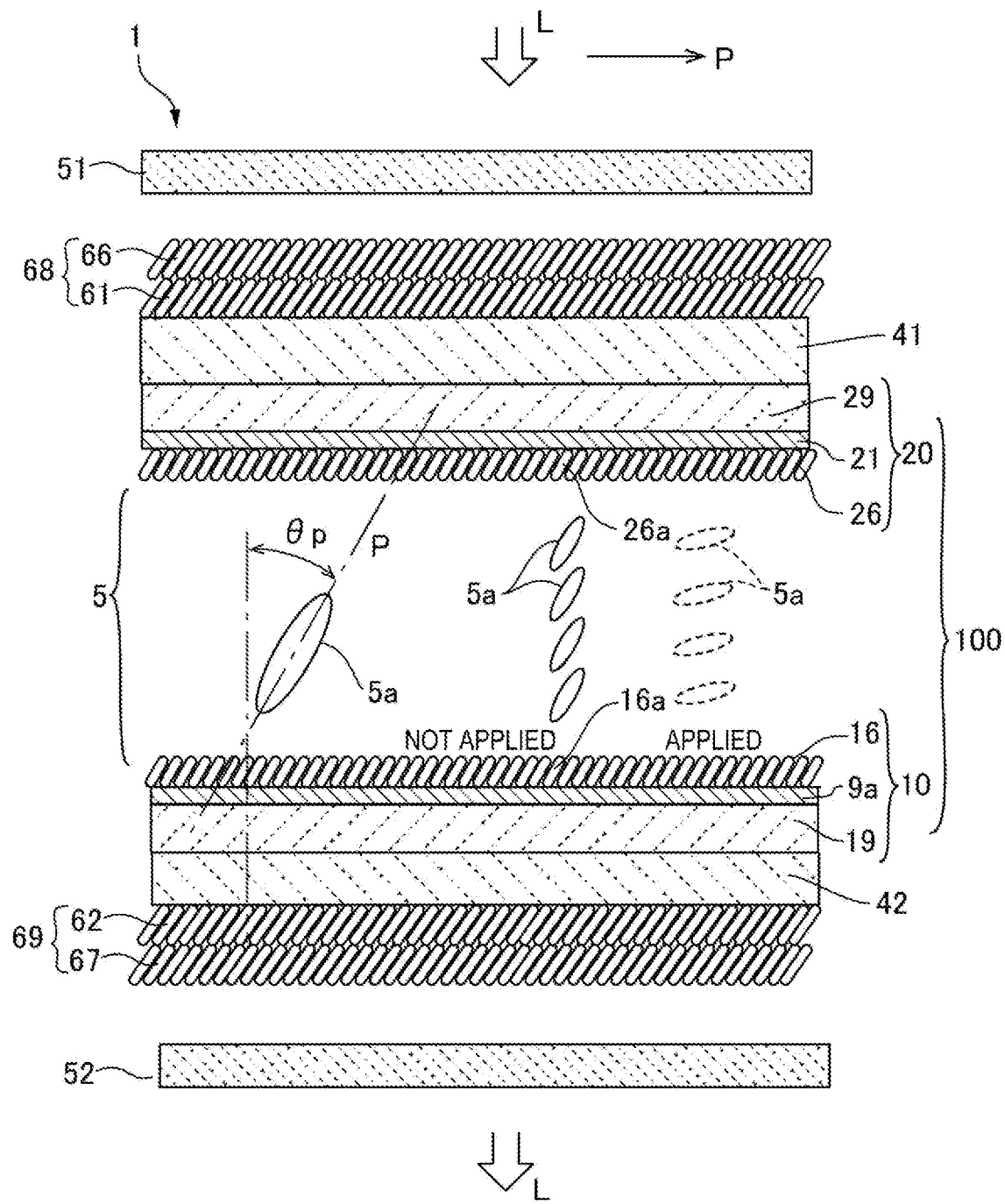
FIG. 11 is an explanatory diagram illustrating an electro-optical device in a second modification example according to the third exemplary embodiment of the present disclosure.

FIG. 11 is an explanatory diagram illustrating the electro-optical device 1 in a second modification example according to the third exemplary embodiment of the present disclosure. As illustrated in FIG. 11, when the optical element 68 illustrated in FIG. 10 is formed, there may be adopted a mode in that a diagonally vapor-deposited film forming the first phase difference element 61 and a diagonally vapor-deposited film forming the first λ/2 phase difference element 66 are layered. Further, when the optical element 69 illustrated in FIG. 10 is formed, there may be adopted a mode in that a diagonally vapor-deposited film forming the second phase difference element 62 and a diagonally vapor-deposited film forming the second λ/2 phase difference element 67 are layered.

4. Fourth Exemplary Embodiment

Figure 12:
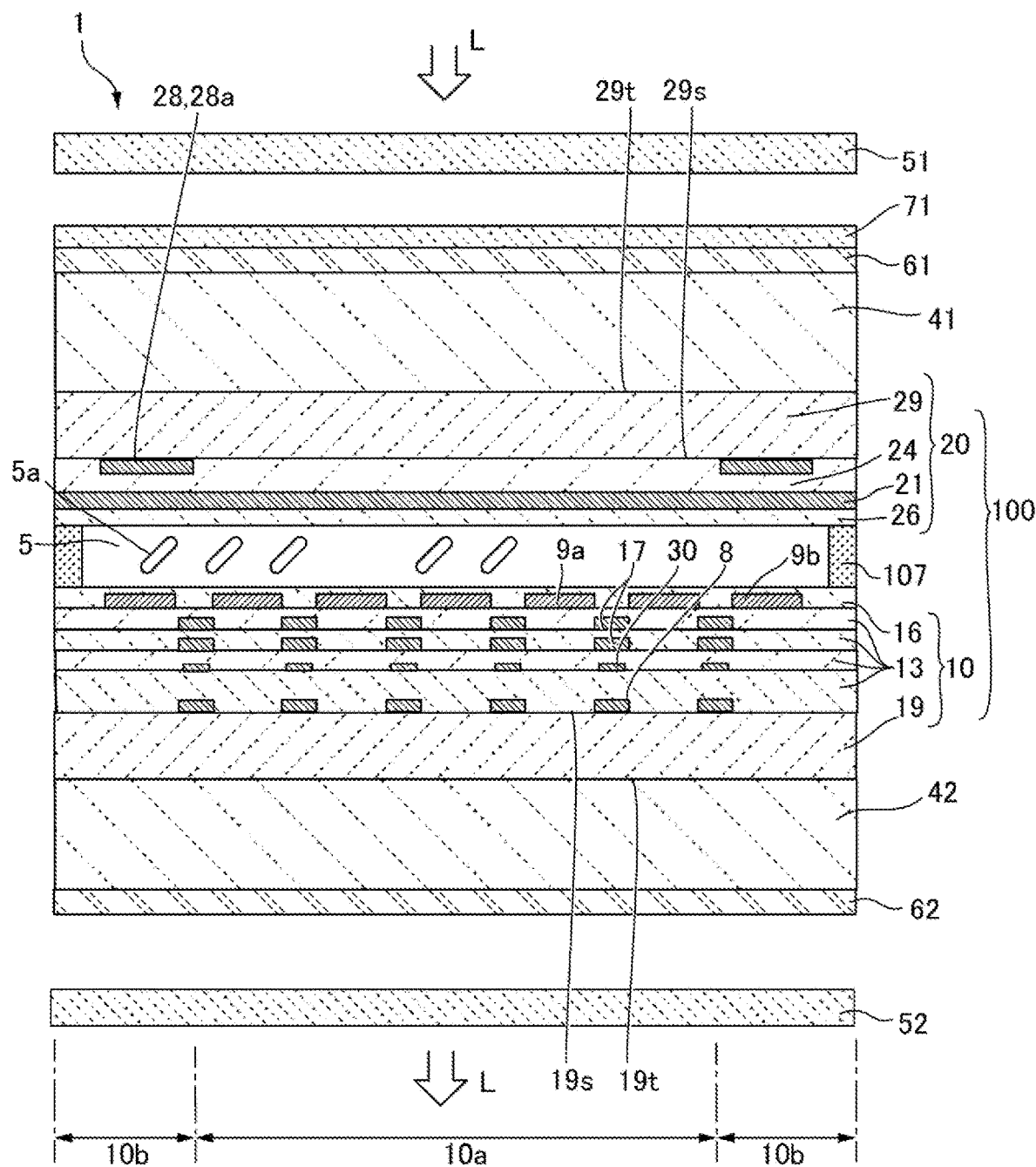
FIG. 12 is an explanatory diagram illustrating an electro-optical device according to a fourth exemplary embodiment of the present disclosure.

FIG. 12 is an explanatory diagram illustrating the electro-optical device 1 according to a fourth exemplary embodiment of the present disclosure. As illustrated in FIG. 12, in the electro-optical device 1, a contrast or a visual field angle property may be improved by providing one or more types of a phase difference compensation element 71 formed of a C plate, an O plate, or an A plate. Note that the phase difference compensation element is preferably arranged between the panel and the phase difference element in an optical sense, which exerts a compensation effect more. However, when the phase difference element 61 is necessarily provided first for a production reason, or an additional compensation plate is necessarily provided to an outer side of the phase difference element 61, such arrangement can exert a compensation effect to a certain extent.

For each of a C plate, an O place, and an A plate, a refractive index ellipsoid indicating three-dimensional distribution of a refractive index is defined as follows. Here, a coordinate axis in a substrate plane of the first substrate 10 or the second substrate 20 is an XY axis, and a normal line direction is a Z axis. A main refractive index in an X-axis direction is Nx, a main refractive index in a Y-axis direction is Ny, and a main refractive index in a Z-axis direction is Nz.

The A plate (positive A plate) satisfies the following condition expression.

$Nx > Ny = Nz$

The C plate (negative C plate) satisfies the following condition expression.

$Nx = Ny > Nz$

The refractive index ellipsoid itself of the O plate is inclined with respect to the substrate, and is inclined at a certain angle from the substrate normal line with respect to $Nx > Ny > Nz$ with the Y axis as a rotation axis, for example. As viewed from the substrate normal line, the slow axis in the ellipsoid cross section taken along the XY plane is in the Y-axis direction. However, the present disclosure is not limited to the above-mentioned conditions, and the Y-axis direction may be a phase advancing axis depending on an ellipsoid shape and its inclination.

The phase difference compensation element 71 is formed of an inorganic material or an organic material. When the phase difference compensation element 71 is the C plate formed of an inorganic material, the phase difference compensation element 71 is formed of an inorganic film in which a high-refractive index layer and a low-refractive index layer are alternately layered, for example. Examples of the high-refractive index layer include a tantalum oxide film, a niobium oxide film, a titanium oxide film, a silicon nitride film, and a silicon oxynitride film. For example, the high-refractive index layer is formed of a niobium oxide film having a refractive index of 2.3, and the low-refractive index layer is formed of a silicon oxide film having a refractive index of 1.5. When the phase difference compensation element 71 is the O plate formed of an inorganic material, the phase difference compensation element 71 is formed of an inorganic film such as a tantalum oxide film subjected to diagonal vapor-deposition.

4-1. Modification Example of Fourth Exemplary Embodiment

Figure 13:
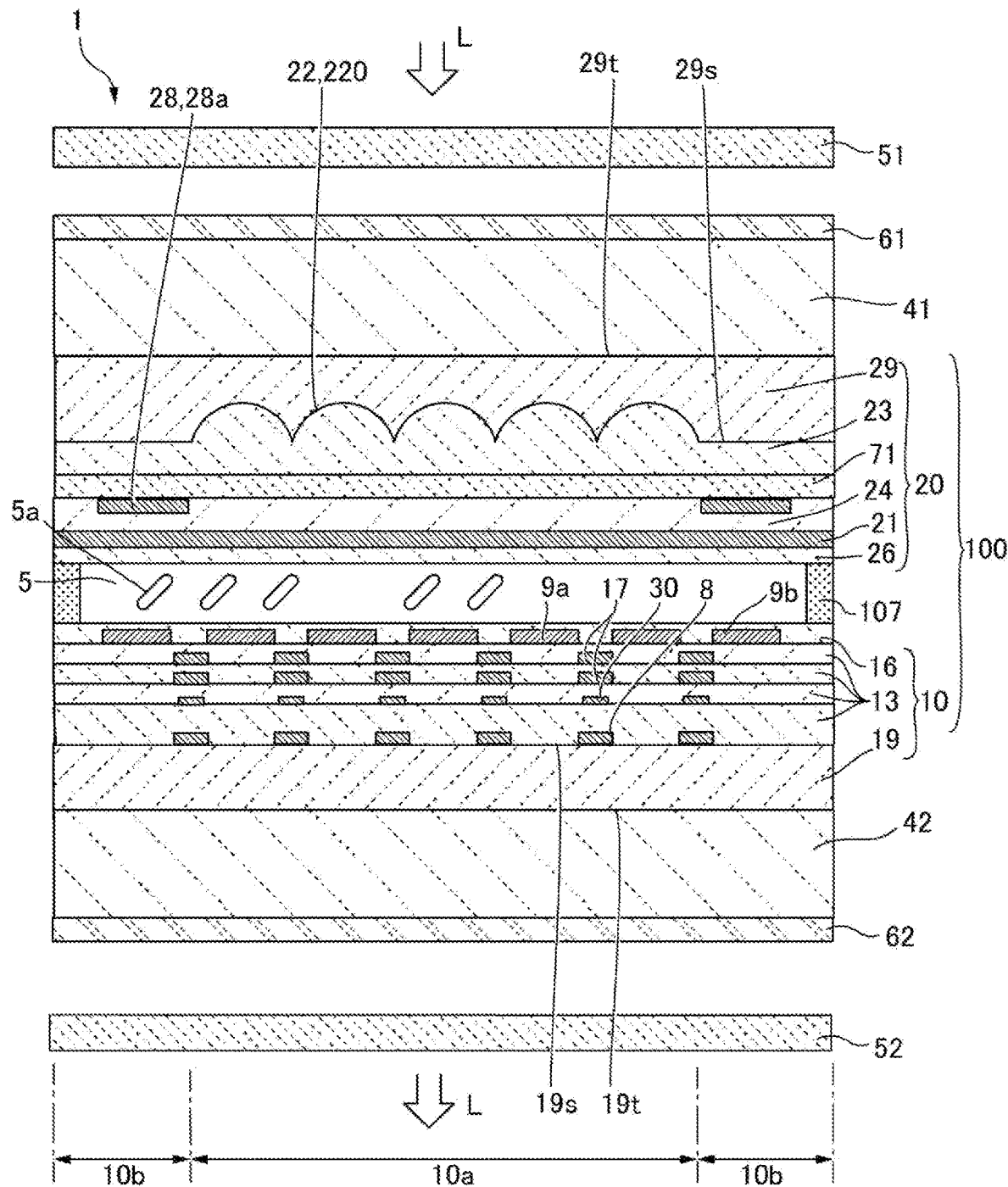
FIG. 13 is an explanatory diagram illustrating an electro-optical device in a first modification example according to the fourth exemplary embodiment of the present disclosure.

FIG. 13 is an explanatory diagram illustrating the electro-optical device 1 in a first modification example according to the fourth exemplary embodiment of the present disclosure. As illustrated in FIG. 13, in some cases, the electro-optical device 1 improves light utilization efficiency by providing the second substrate 20 with a lens array 22 including a plurality of micro-lenses 220 overlapping with the plurality of pixel electrodes 9a, respectively, on one-to-one correspondence in plan view. On the one surface 29s of the substrate main body 29, a plurality of lens surfaces, which are concave surfaces overlapping with the plurality of pixel electrodes 9a, respectively, on one-to-one correspondence in plan view, are formed. With this, the lens array 22 is formed. Further, a transmissive lens layer 23 is layered between the one surface 29s of the substrate main body 29 and the flattened layer 24, and the lens layer 23 has a flattened surface on a side opposite to the substrate main body 29. The substrate main body 29 has a refractive index different from that of the lens layer 23, and the lens surfaces and the lens layer 23 form the micro-lenses 220. In the present exemplary embodiment, the lens layer 23 has a refractive index greater than the refractive index of the substrate main body 29. For example, the substrate main body 29 is formed of a quartz substrate (silicon oxide, $SiO_2$), and has the refractive index of 1.48. Meanwhile, the lens layer 23 is formed of a silicon oxynitride film (SiON), and has the refractive index from 1.58 to 1.68. Thus, the micro-lens 220 has power for converging light from a light source.

Here, the phase difference compensation element 71 is provided at a position other than the space between the lens array 22 and the liquid crystal layer 5. For example, the phase difference compensation element 71 is an inorganic film layered between the lens layer 23 and the flattened layer 24. With this configuration, an incident angle of a light beam on the phase difference compensation element 71 and that on the liquid crystal layer 5 are equal to each other, and hence the phase difference compensation element 71 can perform phase difference compensation for the liquid crystal layer 5. Note that, for example, the phase difference compensation element 71 may be provided between the pixel electrodes 9a and the insulating films 13 in the first substrate 10.

5. Fifth Exemplary Embodiment

Figure 14:
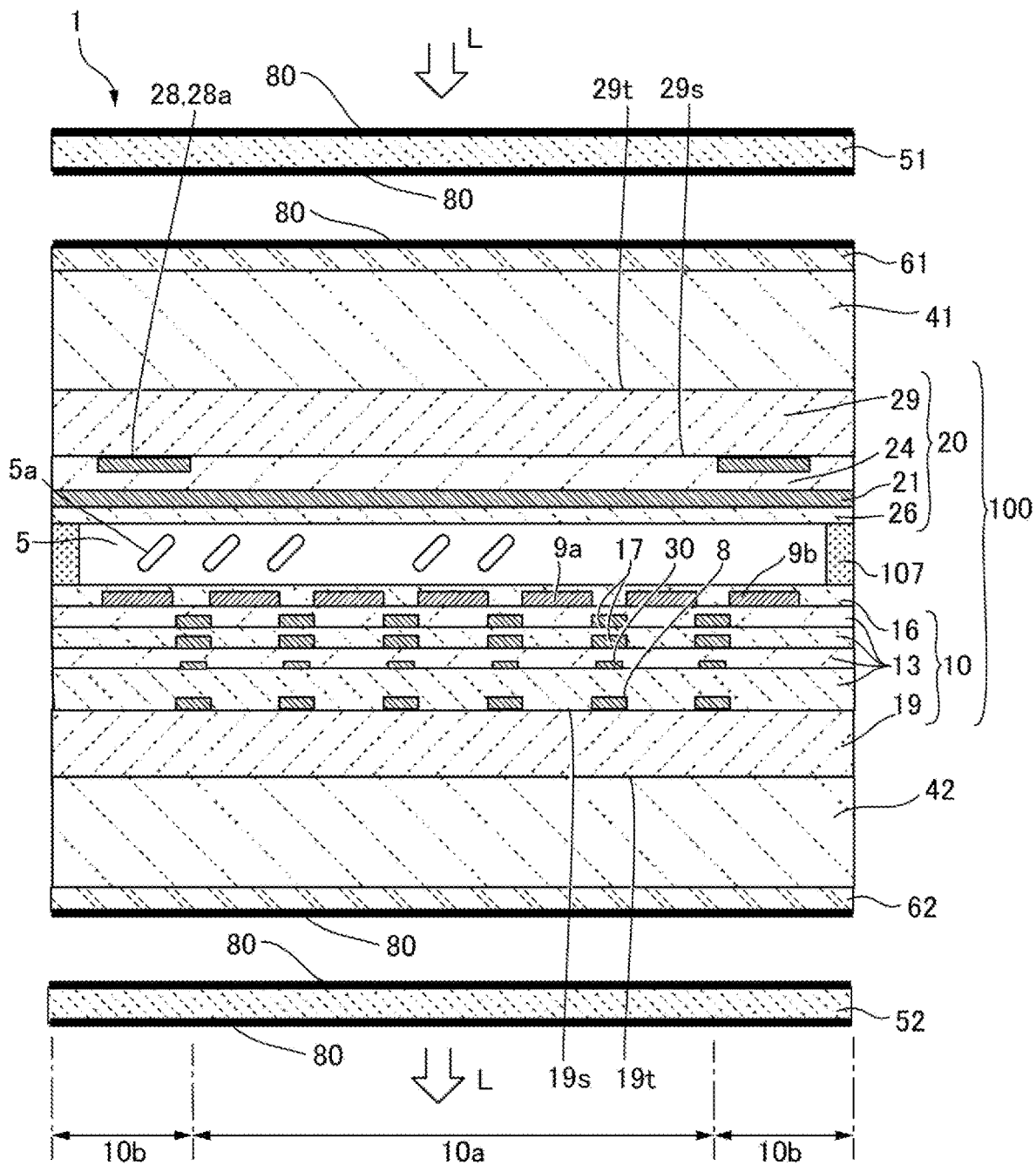
FIG. 14 is an explanatory diagram illustrating an electro-optical device according to a fifth exemplary embodiment of the present disclosure.

FIG. 14 is an explanatory diagram illustrating the electro-optical device 1 according to a fifth exemplary embodiment. As illustrated in FIG. 14, in the electro-optical device 1 according to the present exemplary embodiment, an anti-reflection layer 80 is formed at one of both the surfaces of each of the optical members, which is brought into contact with air. The anti-reflection layer 80 is formed of a layered film including a low-refractive index layer and a high-refractive index layer. Therefore, reflection can be suppressed at an interface between each of the optical members and air. With this, loss of display light due to reflection, occurrence of stray light, or the like can be suppressed.

In the present exemplary embodiment, both the surfaces of each of the first polarizing element 51 and the second polarizing element 52 are brought into contact with air. Thus, the anti-reflection layer 80 is formed at both the surfaces of each of the first polarizing element 51 and the second polarizing element 52. Further, the surface of the first phase difference element 61 on the first polarizing element 51 side and the surface of the second phase difference element 62 on the second polarizing element 52 side are brought into contact with air. Thus, the anti-reflection layer 80 is formed at the surface of the first phase difference element 61 on the first polarizing element 51 side and the surface of the second phase difference element 62 on the second polarizing element 52 side.

6. Sixth Exemplary Embodiment

Figure 15:
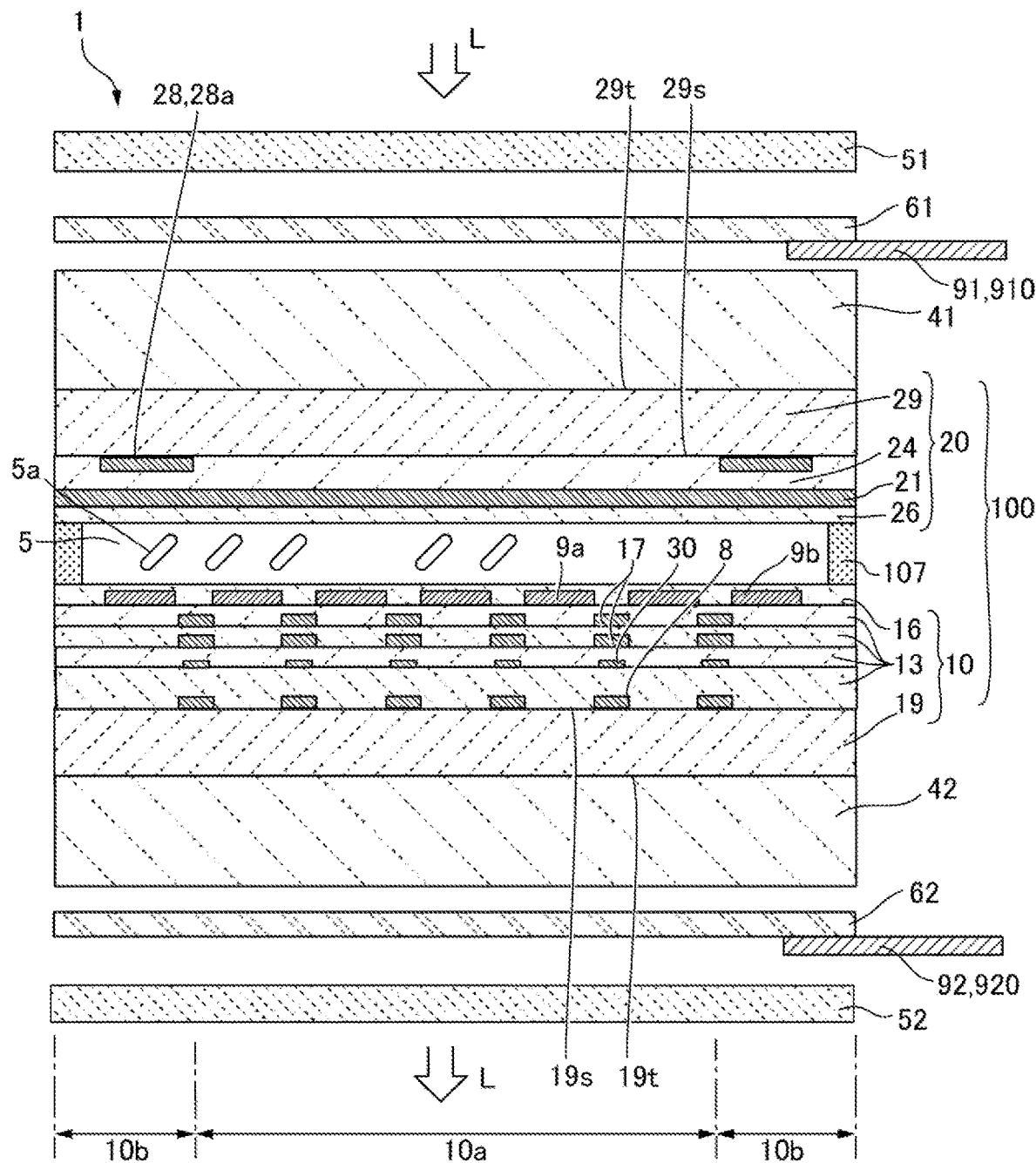
FIG. 15 is an explanatory diagram illustrating an electro-optical device according to a sixth exemplary embodiment of the present disclosure.

FIG. 15 is an explanatory diagram illustrating the electro-optical device 1 according to a sixth exemplary embodiment of the present disclosure. In the electro-optical device 1 according to the first exemplary embodiment to the fourth exemplary embodiment, the first phase difference element 61 and the second phase difference element 62 are provided. Thus, reduction of the contrast ratio can further be suppressed while suppressing the influence of the orientation defect more appropriately. Here, when the electro-optical device 1 displays an image in an electronic apparatus for business use, a character and a line are displayed in most cases, and a character and a line are bold due to a display defect caused by a liquid crystal orientation defect described above, which is problematic. Thus, the first phase difference element 61 and the second phase difference element 62 are provided. With this, the influence of the orientation defect can be suppressed more appropriately.

Meanwhile, when the electro-optical device 1 displays an image in an electronic apparatus for home use, an image such as a natural image and animation is mainly displayed. Thus, it is difficult to visually recognize boldness of a character and a line. Rather, importance is placed on a contrast ratio. In this case, as understood from FIG. 6, the contrast ratio is high when the first phase difference element 61 and the second phase difference element 62 are not provided.

In view of this, in the present exemplary embodiment, instead of fixing each of the first phase difference element 61 and the second phase difference element 62 to another optical member, there is provided a switching mechanism that performs switching between a first state and a second state. In the first state, the first phase difference element 61 and the second phase difference element 62 are positioned in an optical path from the first polarizing element 51 to the second polarizing element 52 via the liquid crystal panel 100. In the second state, the first phase difference element 61 and the second phase difference element 62 are out of the optical path. For example, as illustrated in FIG. 15, a switching mechanism 91 and a switching mechanism 92 are provided. The switching mechanism 91 includes a guide 910 that moves the first phase difference element 61 to a position out of the optical path from the first polarizing element 51 to the liquid crystal panel 100, and the like. The switching mechanism 92 includes a guide 920 that moves the second phase difference element 62 to a position out of the optical path from the liquid crystal panel 100 to the second polarizing element 52. Therefore, when a character and a line are mainly displayed by the electro-optical device 1, the first phase difference element 61 and the second phase difference element 62 are arranged in the optical path. When a natural image, animation, and the like are mainly displayed by the electro-optical device 1, the switching mechanisms 91 and 92 can be used to move the first phase difference element 61 and the second phase difference element 62 out of the optical path.

7. Seventh Exemplary Embodiment

Figure 16:
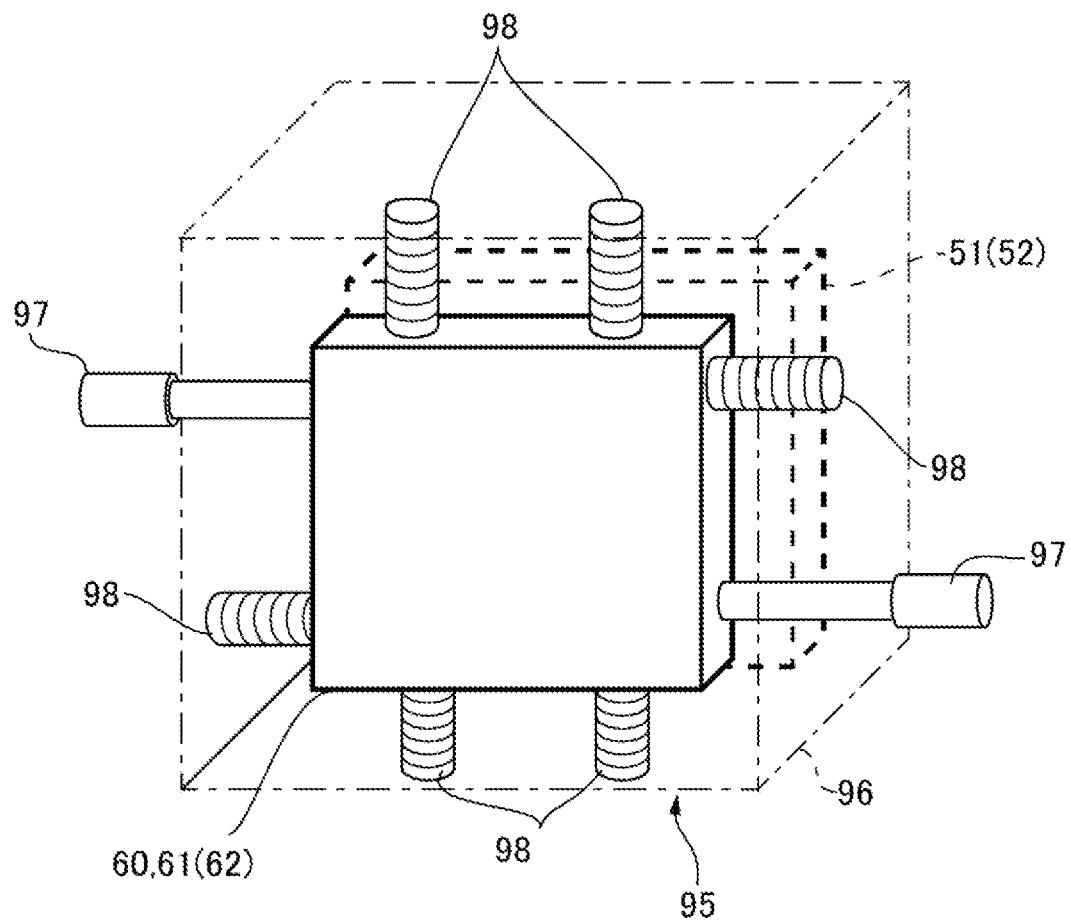
FIG. 16 is an explanatory diagram illustrating an electro-optical device according to a seventh exemplary embodiment of the present disclosure.

FIG. 16 is an explanatory diagram illustrating the electro-optical device 1 according to a seventh exemplary embodiment. In the present exemplary embodiment, when each of the first phase difference element 61 and the second phase difference element 62 is switched between the first state of being positioned in the optical path from the first polarizing element 51 to the second polarizing element 52 via the liquid crystal panel 100 and the second state being positioned out of the optical path, each of the first phase difference element 61 and the second phase difference element 62 is rotated along an in-plane direction.

More specifically, for example, as illustrated in FIG. 16, a switching mechanism 95 includes a frame 96 that supports the first phase difference element 61 and the first polarizing element 51. On the frame 96, an elastic body 98 such as a spring and rubber supports a support plate 60 provided with the first phase difference element 61. Further, the frame 96 is provided with adjustment screws 97 at two positions of the frame 96 that face each other. Therefore, when the adjustment screws 97 press the end of the support plate 60, the angular position of the first phase difference element 61 can be adjusted. The second phase difference element 62 is also provided with the similar switching mechanism 95. Therefore, when a character and a line are mainly displayed by the electro-optical device 1, the first phase difference element 61 and the second phase difference element 62 are set in the optical path so that the slow axis of the first phase difference element 61 and the polarizing axis of the first polarizing element 51 form an angle of 45 degrees and the slow axis of the second phase difference element 62 and the polarizing axis of the second polarizing element 52 form an angle of 45 degrees. Meanwhile, when a natural image, animation, and the like are mainly displayed by the electro-optical device 1, the switching mechanism 95 is used to rotate the first phase difference element 61 and the second phase difference element 62 in the in-plane direction. With this, the first phase difference element 61 and the second phase difference element 62 are set in the optical path so that the slow axis of the first phase difference element 61 is orthogonal to or parallel to the polarizing axis of the first polarizing element 51 and the slow axis of the second phase difference element 62 is orthogonal to or parallel to the polarizing axis of the second polarizing element 52. As a result, without moving the first phase difference element 61 and the second phase difference element 62 out of the optical path, a state similar to the state the first phase difference element 61 and the second phase difference element 62 are moved out of the optical path can be obtained. Therefore, without providing an additional space in the periphery of the optical path, a configuration suitable for displaying a natural image, animation, and the like can be obtained.

8. Installation Example to Electronic Apparatus

Figure 17:
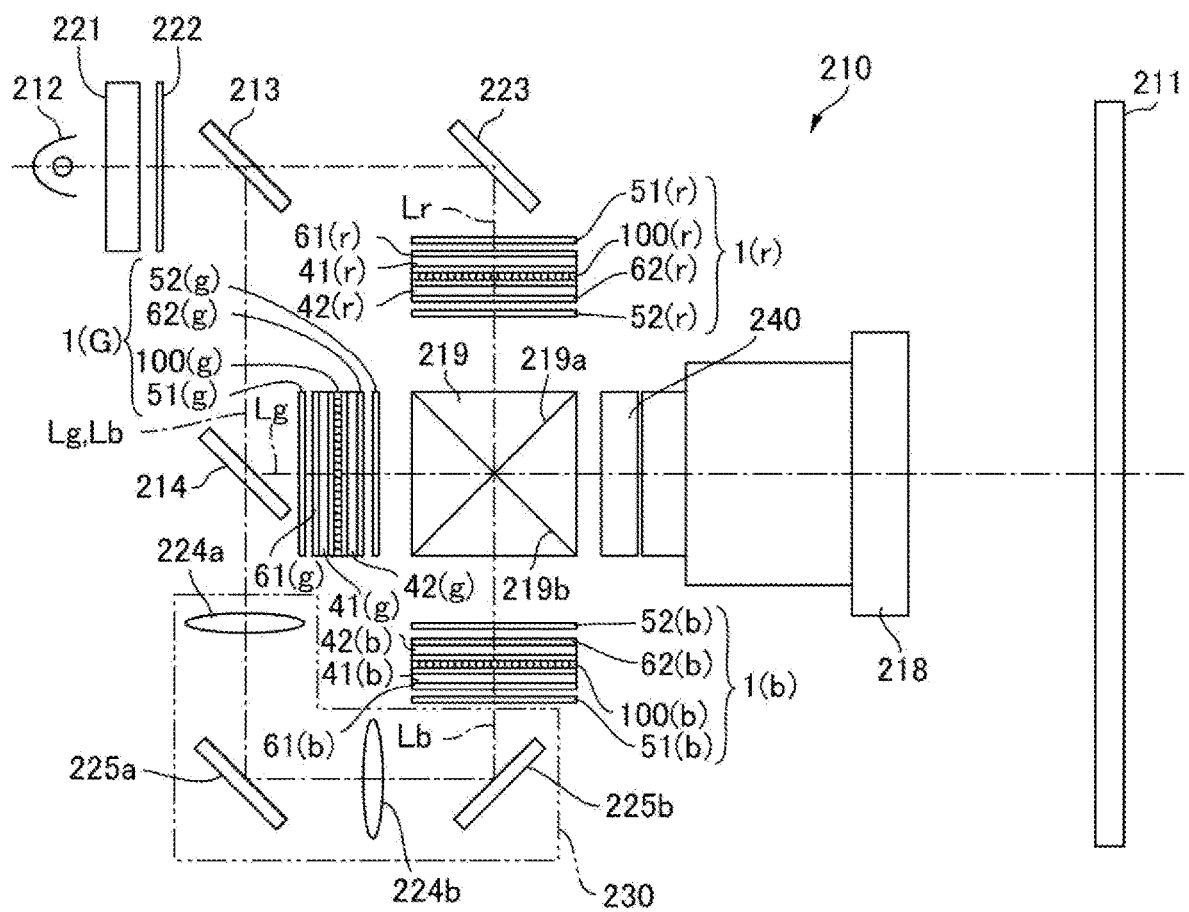
FIG. 17 is a schematic configuration diagram of a projector using the electro-optical device to which the present disclosure is applied.

FIG. 17 is a schematic configuration view of a projection-type display apparatus using the electro-optical device 1 to which the present disclosure is applied. The projection-type display apparatus illustrated in FIG. 17 is an example of an electronic apparatus using the electro-optical device 1. Note that in the descriptions below, although a plurality of electro-optical devices 1 to which light in mutually different wavelength regions are supplied are used, the electro-optical device 1 to which the present disclosure is applied is used in those electro-optical devices.

A projection-type display apparatus illustrated in FIG. 17 is a projector 210 of a forward projection type that projects an image on a screen 211 provided in front of the projector. A projection-type display apparatus 210 includes a light source 212, dichroic mirrors 213 and 214, three light valves (an electro-optical device 1(r) for red light, an electro-optical device 1(g) for green light, and an electro-optical device 1(b) for blue light) each being the electro-optical device to which the present disclosure is applied, a projection optical system 218, an optical path shifting element 240, a cross dichroic prism 219 (color combining optical system), and a relay system 230.

The light source 212 is formed of, for example, an extra-high-pressure mercury lamp, a semiconductor laser, or the like that supplies light including red light, green light, and blue light. The dichroic mirror 213 has a configuration of transmitting red light Lr from the light source 212 and reflecting green light Lg and blue light Lb. Further, the dichroic mirror 214 has a configuration of transmitting the blue light Lb selected from the green light Lg and the blue light Lb that are reflected by the dichroic mirror 213 and reflecting the green light Lg. In this way, the dichroic mirrors 213 and 214 form a color separation optical system that separates light emitted from the light source 212 into the red light Lr, the green light Lg, and the blue light Lb. An integrator 221 and a polarization conversion element 222 are sequentially arranged, between the dichroic mirror 213 and the light source 212, from the light source 212. The integrator 221 equalizes the illuminance distribution of the light irradiated from the light source 212. The polarization conversion element 222 converts the light from the light source 212 into linearly polarized light having a specific vibration direction such as s-polarized light.

The electro-optical device 1(r) for red light modulates, in accordance with image signals, the red light Lr that passes through the dichroic mirror 213 and then is reflected by a reflection mirror 223. The electro-optical device 1(r) for red light emits the modulated red light Lr toward the cross dichroic prism 219. The electro-optical device 1(r) for red light has a configuration described with reference to FIG. 1 to FIG. 16. For example, the electro-optical device 1(r) for red light includes a first polarizing element 51(r), a first transmissive plate 41(r) for dust prevention, a liquid crystal panel 100(r), a second transmissive plate 42(r) for dust prevention, and a second polarizing element 52(r). Further, the electro-optical device 1(r) for red light includes a first phase difference element 61(r) and a second phase difference element 62(r).

The electro-optical device 1(g) for green light modulates, in accordance with image signals, the green light Lg that is reflected by the dichroic mirror 213 and then is reflected by the dichroic mirror 214. The electro-optical device 1(g) for green light emits the modulated green light Lg toward the cross dichroic prism 219. The electro-optical device 1(g) for green light has a configuration described with reference to FIG. 1 to FIG. 16. For example, similarly to the electro-optical device 1(r) for red light, the electro-optical device 1(g) for green light includes a first polarizing element 51(g), a first transmissive plate 41(g) for dust prevention, a liquid crystal panel 100(g), a second transmissive plate 42(g) for dust prevention, and a second polarizing element 52(g). Further, the electro-optical device 1(g) for green light includes a first phase difference element 61(g) and a second phase difference element 62(g).

The electro-optical device 1(b) for blue light modulates, in accordance with image signals, the blue light Lb that is reflected by the dichroic mirror 213, passes through the dichroic mirror 214, and then passes through the relay system 230. The electro-optical device 1(b) for blue light emits the modulated blue light Lb toward the cross dichroic prism 219. The electro-optical device 1(b) for blue light has a configuration described with reference to FIG. 1 to FIG. 16.

For example, similarly to the electro-optical device 1(r) for red light and the electro-optical device 1(g) for green light, the electro-optical device 1(b) for blue light includes a first polarizing element 51(b), a first transmissive plate 41(b) for dust prevention, a liquid crystal panel 100(b), a second transmissive plate 42(b) for dust prevention and a second polarizing element 52(b). Further, the electro-optical device 1(b) for blue light includes a first phase difference element 61(b) and a second phase difference element 62(b).

The relay system 230 includes relay micro-lenses 224a and 224b and reflection mirrors 225a and 225b. The relay micro-lenses 224a and 224b are provided to prevent the loss of light due to the long optical path of the blue light Lb. The relay micro-lens 224a is arranged between the dichroic mirror 214 and the reflection mirror 225a.

The relay micro-lens 224b is arranged between the reflection mirrors 225a and 225b. The reflection mirror 225a is arranged to reflect, toward the relay micro-lens 224b, the blue light Lb that passes through the dichroic mirror 214 and then is emitted from the relay micro-lens 224a. The reflection mirror 225b is arranged to reflect the blue light Lb that is emitted from the relay micro-lens 224b toward the electro-optical device 1(b) for blue light.

The cross dichroic prism 219 serves as a color combining optical system in which two dichroic films 219a and 219b are orthogonally arranged in an X shape. The dichroic film 219a reflects the blue light Lb and transmits the green light Lg. The dichroic film 219b reflects the red light Lr and transmits the green light Lg.

Accordingly, the cross dichroic prism 219 is configured to synthesize the red light Lr, the green light Lg, and the blue light Lb that are modulated by the electro-optical device 1(r)

for red light, the electro-optical device 1(*g*) for green light, and the electro-optical device 1(*b*) for blue light, respectively, and to emit the synthesized light toward the projection optical system 218. The projection optical system 218, which includes a projection lens (not illustrated), is configured to project the light synthesized by the cross dichroic prism 219 onto the screen 211.

In the projection-type display apparatus 210 thus configured, light having different wavelengths enters the electro-optical device 1(*g*) for green light and the electro-optical device 1(*b*) for blue light. Thus, in at least two electro-optical devices selected from the electro-optical device 1(*r*) for red light, the electro-optical device 1(*g*) for green light, and the electro-optical device 1(*b*) for blue light, the phase difference of the first phase difference element 61 and the second phase difference element 62 described above may differ for each electro-optical device. Further, in the electro-optical device 1(*r*) for red light, the electro-optical device 1(*g*) for green light, and the electro-optical device 1(*b*) for blue light, the phase difference of the first phase difference element 61 and the second phase difference element 62 described above may differ for each electro-optical device. For example, the red light entering the electro-optical device 1(*r*) for red light has a center wavelength of 610 nm, the green light entering the electro-optical device 1(*g*) for green light has a center wavelength of 550 nm, and the blue light entering the electro-optical device 1(*b*) for blue light has a center wavelength of 470 nm. With this, the phase difference of the first phase difference element 61 and the second phase difference element 62 that are used in each of the electro-optical devices 1 may be set to an appropriate value.

Further, the projection optical system 218 includes the optical path shifting element 240. The electro-optical device 1 modulates the light from light source 212, and generates an image. The optical path shifting element 240 shifts a projection position of the generated image on the screen 211 for each predetermined period. With this, resolution of the projection image can be improved. Thus, when the electro-optical device 1 is applied to the projector 210, reduction of the contrast ratio can be suppressed, and an image with high resolution and quality can be displayed while alleviating disorder in the orientation of the liquid crystal molecules due to a horizontal electric field or the like and an influence of disclination.

8-1. Other Electronic Apparatuses

In a projection-type display apparatus, the electro-optical device 1 to which the present disclosure is applied may be configured to use, as a light source unit, an LED light source or a laser light source that emits light in various colors and to supply the light in various colors emitted from the light source to another electro-optical device.

Further, the electro-optical device 1 may be applied to a projector of a rearward projection type that projects a projection image from a side opposite to an observation side, as well as a projector of a forward projection type that projects a projection image from an observation side.

Further, the electronic apparatus to which the electro-optical device 1 is applicable is not limited to the projection-type display apparatus 210. For example, the electro-optical device 1 may be used as a projection-type head-up display (HUD), a direct viewing-type head-mounted display (HMD), and a display unit of an information terminal device such as an electronic book, a personal computer, a digital still camera, a liquid crystal television, a view finder-type or a monitor direct viewing type video recorder, a car navigation system, an electronic note book, and POS.

What is claimed is:

1. An electro-optical device, comprising:
a first polarizing element;
a second polarizing element;
a liquid crystal panel being arranged between the first polarizing element and the second polarizing element;
a first phase difference element being arranged between the first polarizing element and the liquid crystal panel;
a second phase difference element being arranged between the liquid crystal panel and the second polarizing element; and
a phase difference compensation element being arranged inside the liquid crystal panel, wherein
each of the first phase difference element and the second phase difference element provides a phase difference R that satisfies a condition $0<R<\lambda/4$, where a wavelength of light incident on the liquid crystal panel is $\lambda$, wherein
the liquid crystal panel comprises a common electrode and a light-shielding layer, and the light-shielding layer is arranged between the phase difference compensation element and the common electrode.

2. The electro-optical device according to claim 1, wherein
the phase difference R satisfies a condition $\lambda/12<R<\lambda/6$.

3. The electro-optical device according to claim 1, wherein
each of the first phase difference element and the second phase difference element provides the phase difference R of $\lambda/8$.

4. The electro-optical device according to claim 1, wherein
a slow axis of the first phase difference element and a slow axis of the second phase difference element are orthogonal or substantially orthogonal to each other.

5. The electro-optical device according to claim 1, wherein
each of the first phase difference element and the second phase difference element is formed of an inorganic material.

6. The electro-optical device according to claim 1, wherein
each of the first phase difference element and the second phase difference element is formed of an organic material.

7. The electro-optical device according to claim 1, wherein
each of the first phase difference element and the second phase difference element is fixed to the liquid crystal panel.

8. The electro-optical device according to claim 1, wherein
the phase difference compensation element is arranged between the first phase difference element and the second phase difference element.

9. The electro-optical device according to claim 8, wherein
the liquid crystal panel includes:
a first substrate;
a second substrate;
a liquid crystal layer being arranged between the first substrate and the second substrate;
a lens array formed at least one of the first substrate and the second substrate, wherein
the phase difference compensation element is at a position in a light emission direction with respect to the lens array.

10. An electronic apparatus comprising the electro-optical device according to claim 1.

11. A projector, comprising:
a light source;
an electro-optical device configured to modulate light from the light source and generate an image;
a projection optical system configured to project the image generated by the electro-optical device; and
an optical path shifting element configured to shift a projection position of the image, wherein
the electro-optical device includes:
a first polarizing element;
a second polarizing element;
a liquid crystal panel being arranged between the first polarizing element and the second polarizing element;
a first phase difference element being arranged between the first polarizing element and the liquid crystal panel;
a second phase difference element being arranged between the liquid crystal panel and the second polarizing element; and
a phase difference compensation element being arranged inside the liquid crystal panel, wherein
a phase difference R provided by each of the first phase difference element and the second phase difference element satisfies a condition $0<R<\lambda/4$, where a wavelength of light incident on the liquid crystal panel is $\lambda$, wherein
the liquid crystal panel comprises a common electrode and a light-shielding layer, and the light-shielding layer is arranged between the phase difference compensation element and the common electrode.

* * * * *